(12) United States Patent
Greenberg

(10) Patent No.: US 11,794,823 B2
(45) Date of Patent: Oct. 24, 2023

(54) PIPELINE PADDING MACHINE CAB ASSEMBLY

(71) Applicant: WORLDWIDE MACHINERY, LTD., Houston, TX (US)

(72) Inventor: J Evan Greenberg, Houston, TX (US)

(73) Assignee: WORLDWIDE MACHINERY, LTD., Houston, TX (US)

( * ) Notice: Subject to any disclaimer, the term of this patent is extended or adjusted under 35 U.S.C. 154(b) by 573 days.

(21) Appl. No.: 16/839,851

(22) Filed: Apr. 3, 2020

(65) Prior Publication Data
US 2020/0317278 A1    Oct. 8, 2020

Related U.S. Application Data

(60) Provisional application No. 62/830,210, filed on Apr. 5, 2019.

(51) Int. Cl.
| | |
|---|---|
| *B62D 33/077* | (2006.01) |
| *B62D 33/063* | (2006.01) |
| *B60N 2/14* | (2006.01) |
| *E02F 5/22* | (2006.01) |

(52) U.S. Cl.
CPC .......... *B62D 33/077* (2013.01); *B60N 2/14* (2013.01); *B62D 33/063* (2013.01); *E02F 5/223* (2013.01)

(58) Field of Classification Search
CPC ............................ B62D 33/077; B62D 33/063
USPC .................................................... 296/190.05
See application file for complete search history.

(56) References Cited

U.S. PATENT DOCUMENTS

| | | | | |
|---|---|---|---|---|
| 4,018,473 | A  * | 4/1977 | Chalupsky | B62D 33/0636 296/190.04 |
| 9,630,660 | B2 * | 4/2017 | Hellholm | B66C 13/54 |
| 2002/0154984 | A1 * | 10/2002 | Schaeff | E02F 9/02 414/729 |
| 2006/0103156 | A1 * | 5/2006 | Mieger | E02F 9/166 296/26.04 |
| 2006/0202514 | A1 * | 9/2006 | Antonetti | B62D 33/0633 296/190.05 |
| 2008/0258535 | A1 * | 10/2008 | Berning | E01C 21/00 299/39.4 |
| 2010/0300786 | A1 * | 12/2010 | Bacon | B62D 33/063 180/89.15 |

(Continued)

FOREIGN PATENT DOCUMENTS

| | | | | |
|---|---|---|---|---|
| CN | 112406622 | A  * | 2/2021 | |
| CN | 112874640 | A  * | 6/2021 | ........... B62D 33/063 |
| CN | 214396478 | U  * | 10/2021 | |

(Continued)

*Primary Examiner* — Hilary L Gutman
(74) *Attorney, Agent, or Firm* — Morgan, Lewis & Bockius LLP

(57) ABSTRACT

A pipeline padding machine is disclosed. The pipeline padding machine includes a machine main frame, a cabin coupled to the machine main frame and an extension mechanism. The extension mechanism can couple the cabin to the machine main frame. The extension mechanism can be configured to translate the cabin vertically relative to the machine main frame. Because the extension mechanism can translate the cabin vertically, the pipeline padding machine can allow for improved operator access and improved operating positions. Alternatively, or additionally, the cabin may be horizontally translated and/or rotated about a vertical axis.

34 Claims, 39 Drawing Sheets

(56) References Cited

U.S. PATENT DOCUMENTS

2020/0368780 A1* 11/2020 Dondi ...................... E02F 7/06
2020/0392697 A1* 12/2020 Dondi ...................... B07B 1/10

FOREIGN PATENT DOCUMENTS

| CN | 113715920 A | * | 11/2021 | |
|----|-------------|---|---------|------------|
| GB | 2045209 A | * | 10/1980 | ............. B66F 9/147 |
| JP | 2002316790 A | * | 10/2002 | |
| WO | WO-2006020894 A2 | * | 2/2006 | ......... B62D 33/0633 |

* cited by examiner

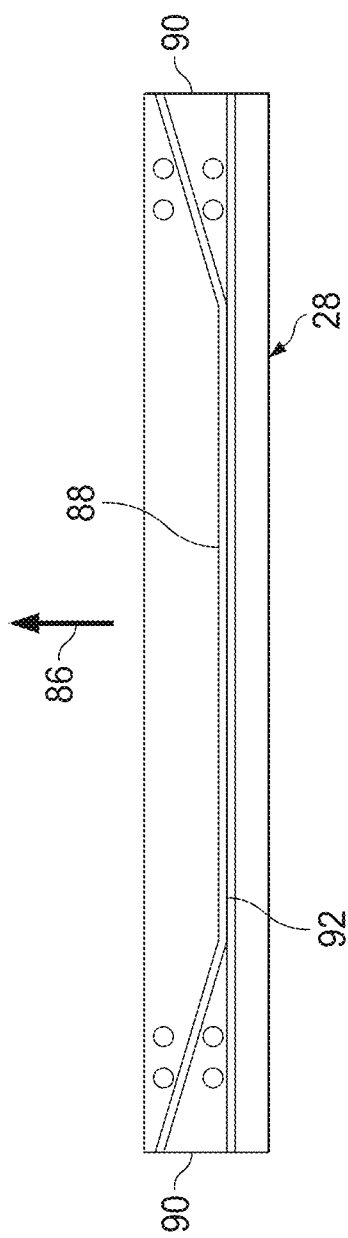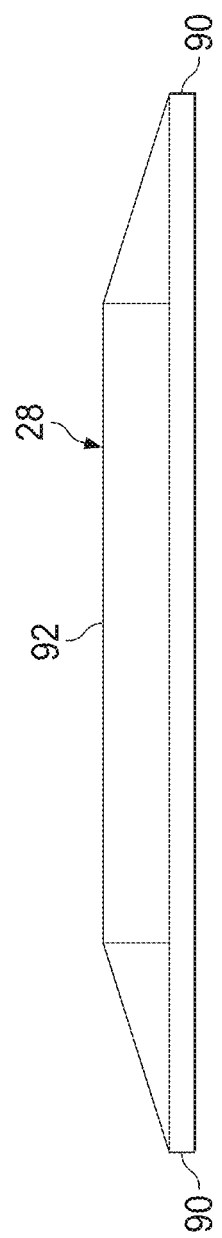

PIPELINE PADDING MACHINE CAB ASSEMBLY

CROSS REFERENCE

This application claims priority from Provisional U.S. Application Ser. No. 62/830,210 filed on Apr. 5, 2019, and entitled PIPELINE PADDING MACHINE CAB ASSEMBLY.

TECHNICAL FIELD

The invention relates to equipment utilized in conjunction with pipeline operations, and more particularly, to pipeline padding machines.

BACKGROUND

In constructing pipelines, a ditch is typically dug by excavating material from the ground, and then a pipe (including many interconnected pipe sections) is positioned in the ditch. The excavated material can include objects (such as large rocks, sharp objects, etc.) which could damage the pipe or otherwise hinder the pipeline operation (such as by creating large voids in the ditch, etc.).

Therefore, instead of merely covering the pipe by pushing the excavated material back into the ditch, only a portion of the excavated material is used around the pipe in the ditch. This portion of the excavated material is the relatively fine portion and is known to those skilled in the art as "padding" since it forms a protective layer surrounding the pipe. The remainder of the excavated material can be deposited in the ditch above the padding if desired.

Several machines have been developed to separate the padding from the remainder of the excavated material and place the padding in the ditch about the pipe. However, these prior padding machines typically have one or more shortcomings. For example, these padding machines may not adequately provide for ease of operator access or transportation of the padding machine.

Therefore, what is needed is an apparatus, system or method that addresses one or more of the foregoing issues, among one or more other issues.

SUMMARY OF THE INVENTION

An embodiment of a pipeline padding machine is disclosed. The pipeline padding machine includes a machine main frame, a cabin coupled to the machine main frame and an extension mechanism. The extension mechanism can couple the cabin to the machine main frame. The extension mechanism may be configured to translate the cabin vertically relative to the machine main frame. Because the extension mechanism can translate the cabin vertically, the pipeline padding machine can allow for improved operator access and improved operating positions.

Another embodiment of a pipeline padding machine is disclosed. The pipeline padding machine includes a machine main frame, a cabin coupled to the machine main frame and a slider mechanism. The slider mechanism couples the cabin to the frame. The slider mechanism can include a rail extending laterally and configured to receive the cabin and an actuator configured to vertically move the cabin along the rail. Because the slider mechanism can translate the cabin vertically, the pipeline padding machine can allow for improved operator access and improved operating positions.

An embodiment of a method to operate a pipeline padding machine is disclosed. The method can include lowering a cabin of the pipeline padding machine relative to the pipeline padding machine to an access position. The method can further include raising the cabin of the pipeline padding machine to an operation position. Because the method can allow for the lowering and raising of the cabin, the method can allow for improved operator access and improved operating positions.

It is to be understood that any of the features of these embodiments may be combined together in various configurations without departing from the scope of the present invention.

BRIEF DESCRIPTION OF THE DRAWINGS

The invention is described with reference to the accompanying figures in which:

FIG. 7 is a plan view of a flight section used in an escalator assembly of the pipeline padding machine; and FIG. 8 is a side elevational view of the escalator flight section.

DETAILED DESCRIPTION OF THE INVENTION

Figure 1:
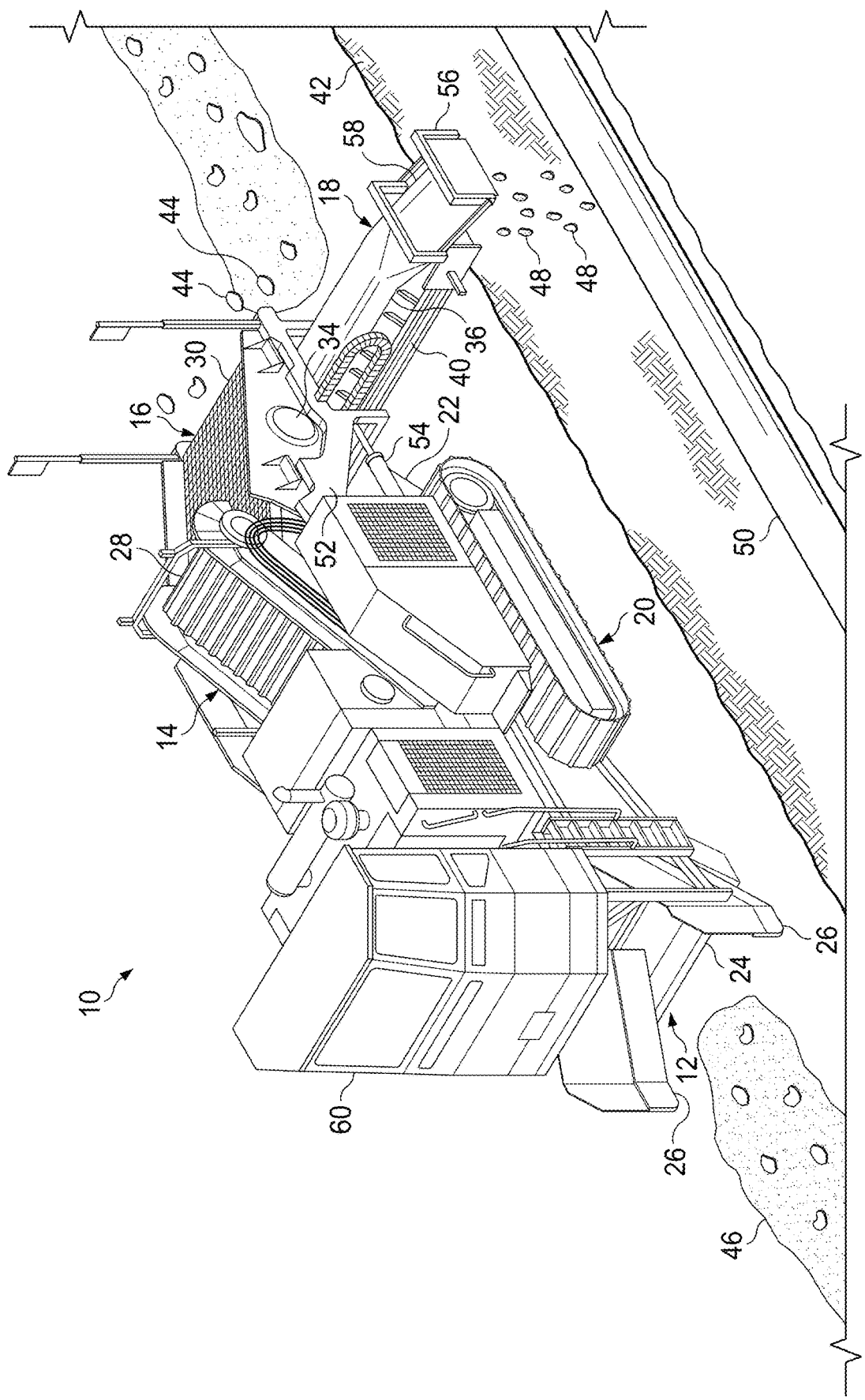
FIG. 1 is an isometric view of a pipeline padding machine embodying principles of the present invention.

Representatively illustrated in FIG. 1 is a pipeline padding machine 10 which embodies principles of the present invention. The machine 10 includes a material collection assembly 12 for gathering material 46 alongside a ditch 42 in which pipe 50 is laid.

The material 46 is typically the same material which was previously excavated to form the ditch 42. However, this is not necessary. For example, the material 46 could be transported from another location, and/or the machine 10 may be used to collect previously undisturbed material from a ground surface as described more fully below.

The machine 10 includes a material escalator assembly 14 for elevating the material 46 from the material collection assembly 12 and depositing the material onto a separator assembly 16. The separator assembly 16 separates the material 46 into a relatively fine padding 48 and a relatively coarse residue 44.

The padding 48 is deposited onto a conveyor assembly 18 which transports the padding laterally to the ditch 42. The padding 48 is deposited from the conveyor assembly 18 into the ditch 42.

A transport assembly 20 is used to transport the machine 10 along the side of the ditch 42. A main frame 22 is attached to the transport assembly 20 for supporting the collection, escalator, separator and conveyor assemblies 12, 14, 16, 18.

The collection assembly 12 includes a cutting edge 24 for cutting through the material 46 piled alongside and generally parallel to the ditch 42, and side walls 26 which are shaped to funnel the material toward a lower end of the escalator assembly 14. As described more fully below, the side walls 26 are vertically adjustable relative to the cutting edge 24, and the cutting edge is pivotable relative to the escalator assembly 14.

The escalator assembly 14 includes a flight of individual sections 28 which are used to elevate the material 46 from the collection assembly 12 and deposit the material onto the separator assembly 16. The escalator assembly 14 is pivotable relative to the main frame 22 about a pivot 32 to thereby vertically adjust the lower end of the escalator assembly. Preferably, the lower end of the escalator assembly 14 is vertically adjustable from about one foot downward to about four feet upward relative to ground level to compensate for various terrain slopes and material collection requirements.

The fight sections 28 may be specially configured so that each flight section can transport a greater quantity of material 46, can transport wet material, and can prevent the material from collecting at the sides of the escalator assembly 14, as described more fully below.

The separator assembly 16 includes a screen 30 which is inclined downward toward the rear of the machine 10. A shaker 34 vibrates the screen 30. The screen 30 has openings sized to permit the relatively fine padding material 48 to pass downward therethrough, while the relatively coarse residue 44 travels across the top of the screen and eventually falls off of the separator assembly 16 onto the ground alongside the ditch 42. Note that the screen 30 has a much larger area as compared to conventional padding machines.

The conveyor assembly 18 includes a belt 36 and rollers 38 (not visible in FIG. 1) mounted to rails 40. The belt 36 is positioned beneath the screen 30 so that the padding material 48 is deposited onto the belt after passing through the screen. The belt 36 transports the padding material 48 laterally, and the padding material then drops off of the belt into the ditch 42.

The rails 40 are used to permit the conveyor assembly 18 to be adjusted laterally, for example, to compensate for varying lateral distances between the machine 10 and the ditch 42. The rails 40 also permit the conveyor assembly 18 to be extended outwardly from either lateral side of the machine 10 so that the machine may be used on either lateral side of the ditch 42.

A deflector 56 is attached to the outer end of the conveyor assembly 18. The deflector 56 is used to more accurately position the padding 48 about the pipe 50 as it falls from the belt 36. A hydraulic cylinder 58 or other type of actuator may be used to pivot or otherwise position the deflector 56 relative to the outer end of the belt 36.

The conveyor assembly 18 may be pivoted so that it is generally vertical during transport of the machine 10 to and from a worksite.

The separator and conveyor assemblies 16, 18 are mounted on a frame 52 which is pivotably mounted to the main frame 22 at the pivots 32. Hydraulic cylinders 54 are used to pivot the frame 52 relative to the main frame 22, but other types of actuators may be used if desired.

Thus, the separator and conveyor assemblies 16, 18 are pivotable relative to the main frame 22 to thereby allow the belt 36 to remain generally horizontal and allow the screen 30 to remain at a desired inclination even though the machine 10 may traverse terrain having varying slopes. That is, although the machine 10 may travel uphill or downhill at varying inclines, the belt 36 can be maintained generally horizontal and the screen 30 can be maintained at a desired inclination by pivoting the frame 52 as needed relative to the main frame 22. In some embodiments, features of the pipeline padding machine 10 can be described in U.S. Pat. No. 7,886,463, titled "PIPELINE PADDING MACHINE," and issued on Feb. 15, 2011.

It will be appreciated that many functions need to be controlled in operation of the machine 10. Among these are: speed and direction of transport of the machine 10 by the transport assembly 20, position of the cutting edge 24, speed and direction of travel of the flight sections 28, pivoting of the escalator assembly 14 relative to the main frame 22, pivoting of the frame 52 relative to the main frame 22, operation of the shaker 34, speed and direction of the belt 36, lateral position of the conveyor assembly 18, position of the deflector 56, etc. Various control devices (such as switches, control valves, etc. of the type known to those skilled in the art) are used to control these functions.

In the embodiment of the machine 10 as depicted in FIG. 1, the control devices are not visible. However, the control devices are located within an enclosed cab 60 attached above the collection assembly 12 and the lower end of the escalator assembly 14. Preferably, an interior of the cab 60 is climate controlled, with air conditioning and heating systems for operator comfort. The cab 60 is also preferably supplied with two laterally separated control station locations so that when the machine 10 is operated on one side of the ditch 42 the operator can clearly view the ditch and the placement of the padding 48 in the ditch from one of the control station locations, and when the machine is operated on the opposite side of the ditch the operator can clearly view the ditch and the placement of the padding in the ditch from the other control station location. The cab is also moveable, as explained in greater detail below in connection with FIGS. 9-14.

Figure 2:
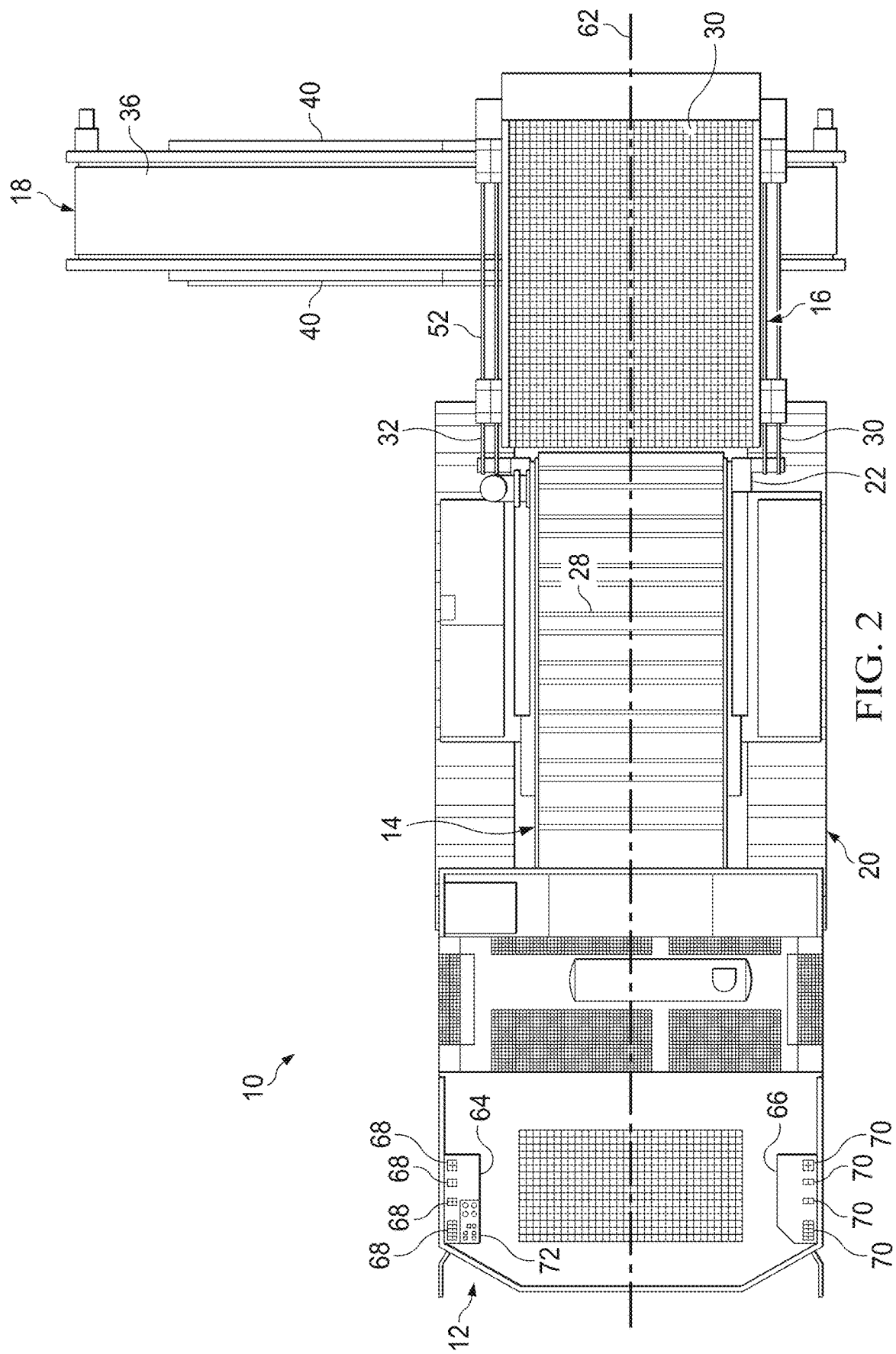
FIG. 2 is a plan view of the pipeline padding machine.

Referring additionally now to FIG. 2, the machine 10 is representatively illustrated from a top plan view with the cab 60 removed. In this view it may be seen that the machine 10 has a longitudinal axis 62. Control station locations 64, 66 are laterally separated on either side of the longitudinal axis 62. An operator may be positioned at the control station location 64 to manipulate control devices 68 while viewing the ditch 42 on one lateral side of the machine 10, and the operator may be positioned at the control station location 66 to manipulate control devices 70 while viewing the ditch on the opposite side of the machine.

It is not necessary for the same control devices to be positioned at each location 64, 66. For example, at the location 64 additional control devices 72 could be used. These control devices 72 could be for functions which the operator does not need to directly control at each location 64, 66.

Note that as depicted in FIG. 2 the conveyor assembly 18 is extended outwardly from an opposite lateral side of the machine 10 as compared to FIG. 1. In addition, the deflector 56 is not shown in FIG. 2.

Figure 3:
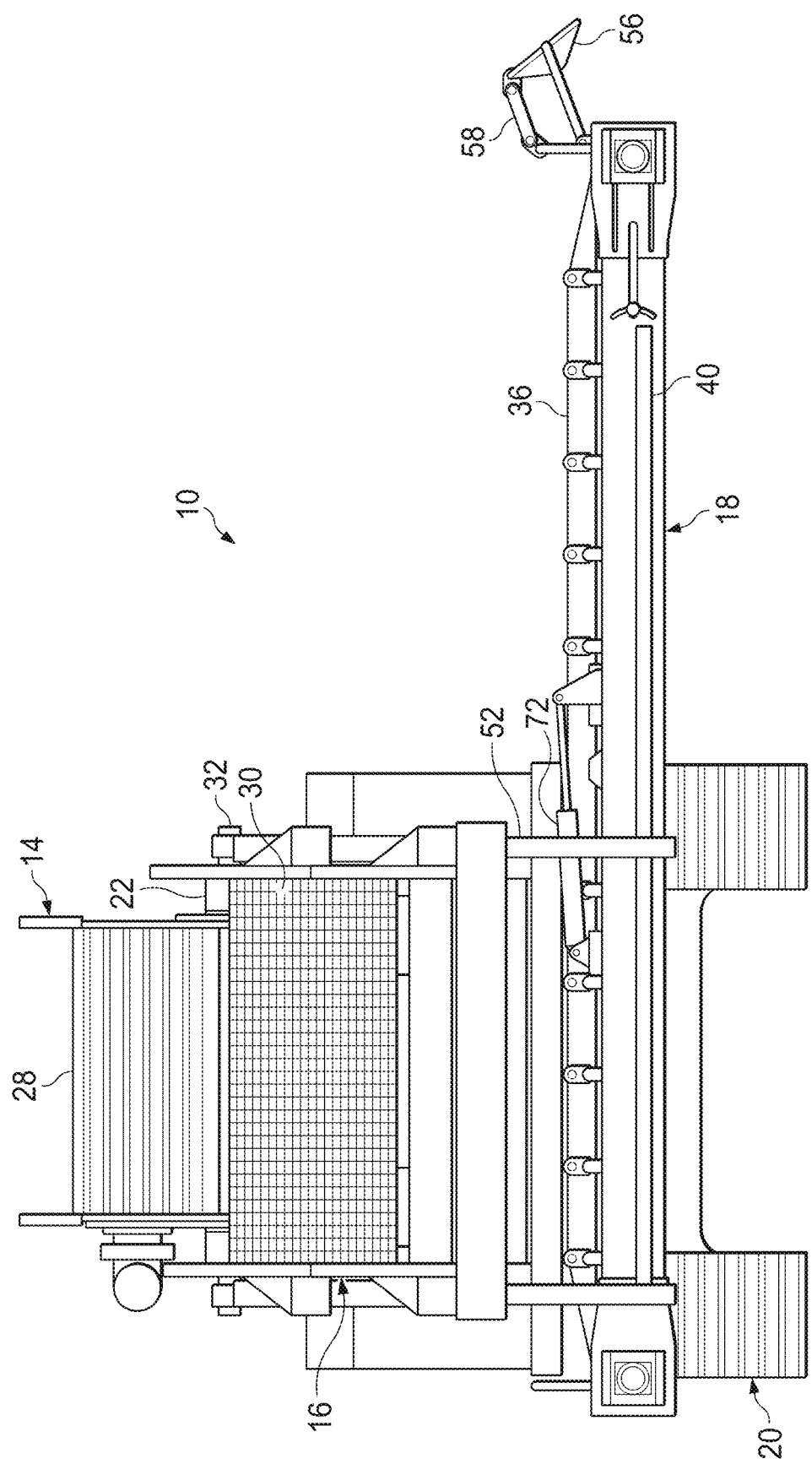
FIG. 3 is an end elevational view of the pipeline padding machine.

Referring additionally now to FIG. 3, the machine 10 is representatively illustrated from a rear elevational view. In this view the manner in which a hydraulic cylinder 72 is used to laterally adjust the position of the conveyor assembly 18 may be clearly seen.

Figure 4:
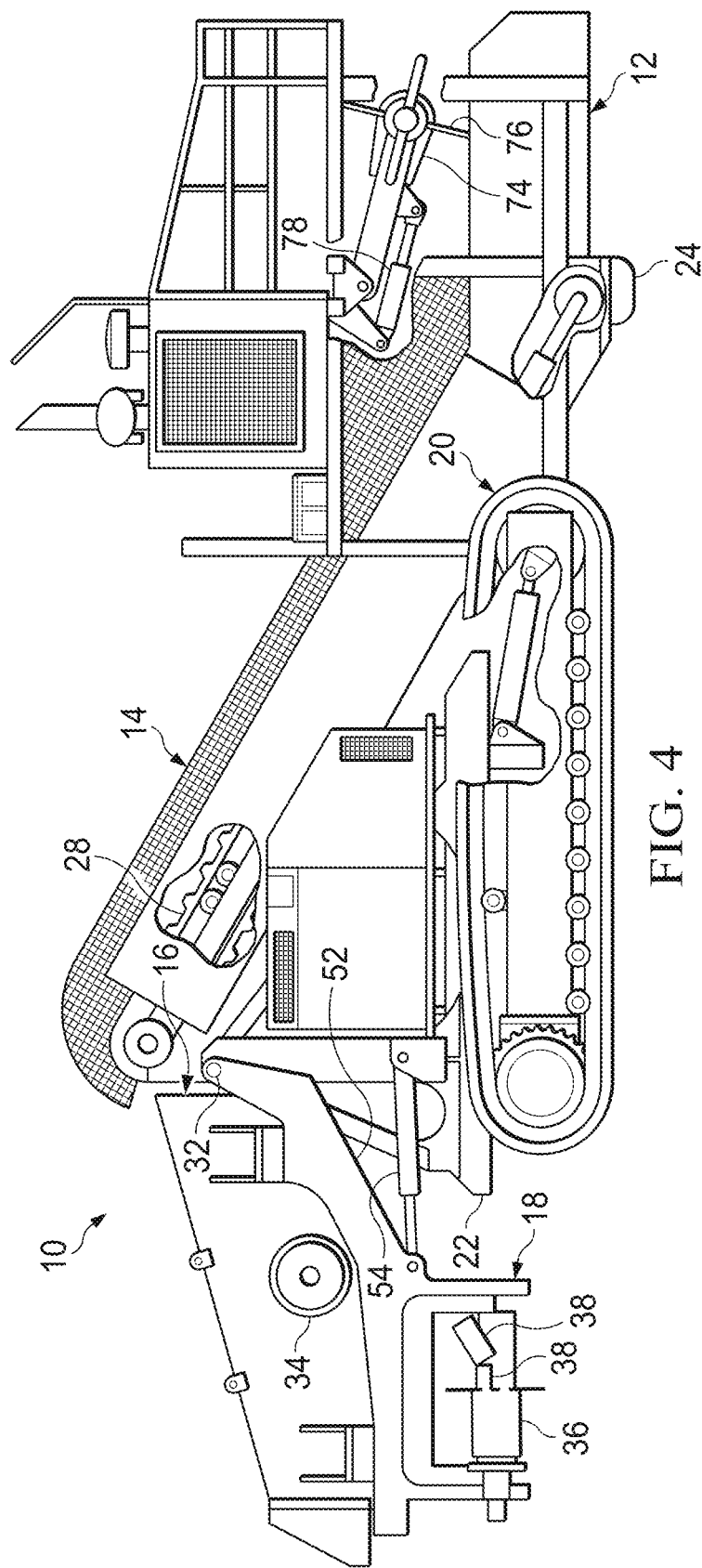
FIG. 4 is a side elevational view of the pipeline padding machine.

Referring additionally now to FIG. 4, the machine 10 is representatively illustrated from a side elevational view. In this view various details of the escalator, conveyor and collection assemblies 12, 14, 18 are shown.

A cutaway of the conveyor assembly 18 shows the rollers 38 used to support the belt 36. It is not necessary for the conveyor assembly 18 to include the belt 36 and rollers 38, since other types of conveyors (such as segmented or tracked-type conveyors, etc.) could be used instead.

A cutaway of the escalator assembly 14 shows how the flight sections 28 are connected to each other and displaced along the escalator flight. Other types of escalator assemblies (such as assemblies using belts, etc.) could be used in the place of the illustrated escalator assembly 14.

A cutaway of the collection assembly 12 shows an optional material conditioner 74 which may be used to condition the material 46. The conditioner 74 could, for example, sweep the material 46 toward the lower end of the escalator assembly 14, break up the material into smaller pieces, crush ice in the material or otherwise condition the material prior the material being elevated by the escalator assembly 14.

The conditioner 74 includes arms 76 which are rotated to condition the material 46. The arms 76 are vertically adjusted by means of a hydraulic cylinder 78 or other actuator which pivots the conditioner 74 relative to the lower end of the escalator assembly 14.

Figure 5:
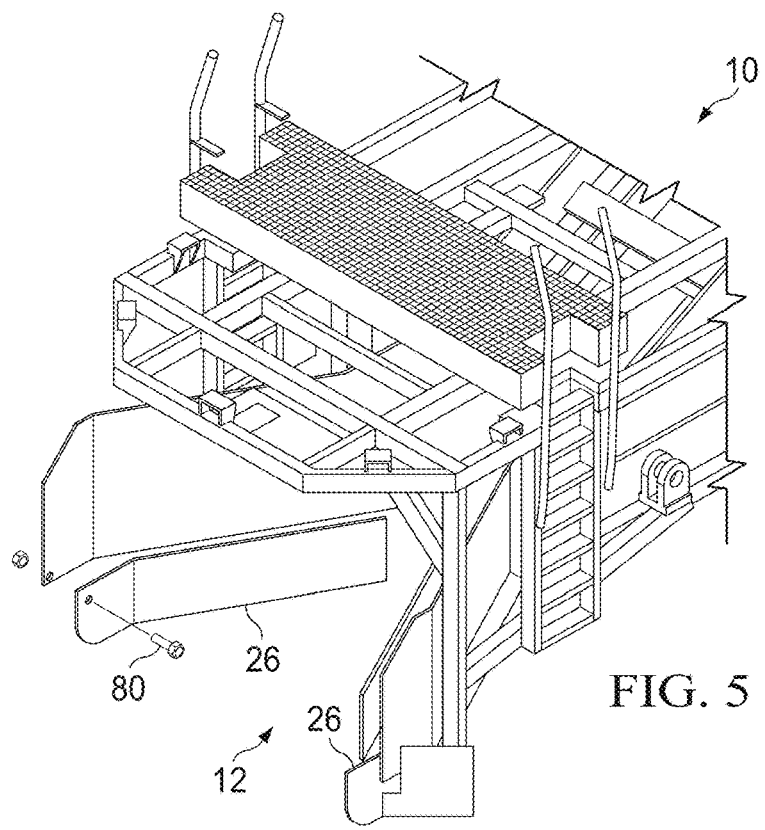
FIG. 5 is an isometric view of a material collection assembly of the pipeline padding machine.

Referring additionally now to FIG. 5, a portion of the machine 10 is representatively illustrated showing the manner in which the side walls 26 may be vertically adjusted. Mechanical fasteners 80 (such as screws, bolts, pins, etc.) may be used to fasten the side walls 26 in various vertical positions relative to the lower end of the escalator assembly 14 and the cutting edge 24. Other means of vertically adjusting the side walls 26 (such as actuators, etc.) may be used in keeping with the principles of the invention.

One advantage of the ability to vertically adjust the side walls 26 relative to the lower end of the escalator assembly 14 is that, if the lower end of the escalator assembly is raised or lowered (e.g., by pivoting the escalator assembly relative to the main frame 22 to compensate for varying terrain, etc.), the side walls 26 can be independently raised or lowered so that they are properly positioned to gather the material efficiently.

Figure 6:
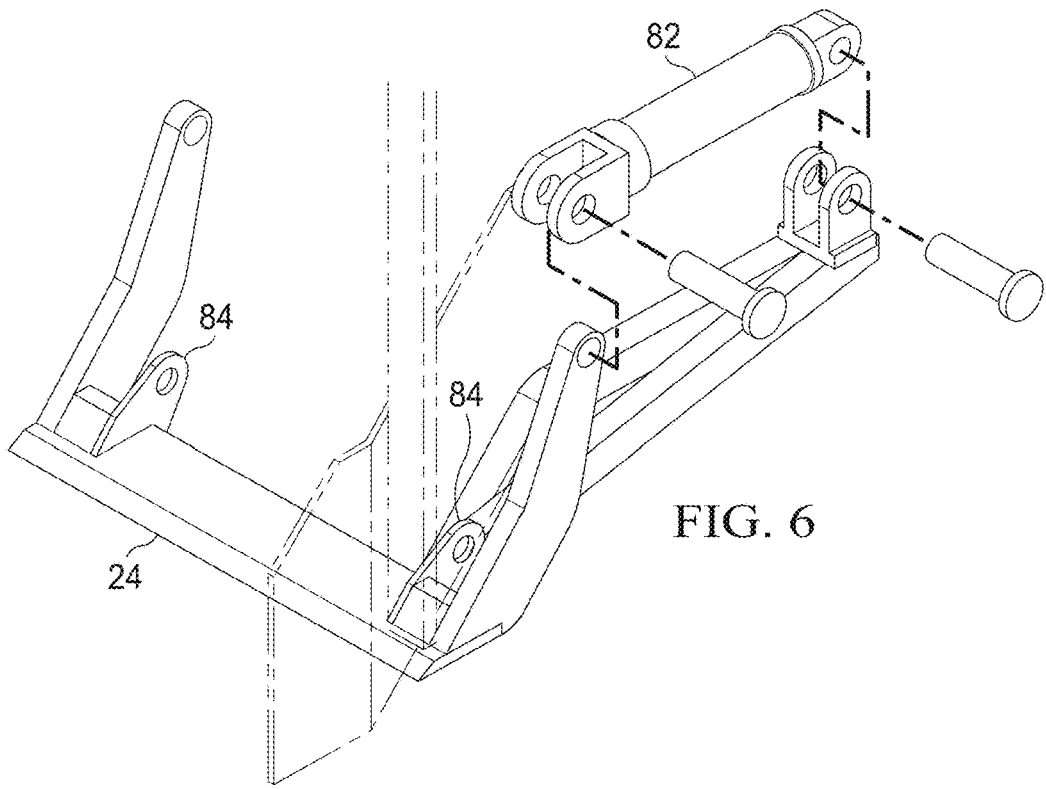
FIG. 6 is an enlarged isometric exploded view of a cutting assembly of the pipeline padding machine.

Referring additionally now to FIG. 6, the manner in which the cutting edge 24 may be pivoted relative to the lower end of the escalator assembly 14 is representatively illustrated. Specifically, a hydraulic cylinder 82 may be used to rotate the cutting edge 24 about pivots 84.

Preferably, the cutting edge 24 is pivotable up to about 25 degrees below horizontal. In this manner the cutting edge 24 can be positioned at an optimum angle for cutting through and collecting the material 46, and can even be adjusted to cut into previously undisturbed ground.

If the cutting edge 24 is adjusted so that it is cutting into virgin ground, the side walls 26 are preferably vertically positioned so that their lower ends are at or just above the ground (i.e., the lower ends of the side walls are vertically higher than the cutting edge). If the cutting edge 24 is adjusted so that it cuts through the material 46, the side walls 26 are preferably adjusted so that their lower ends are even with or somewhat vertically lower than the cutting edge. Thus, it is a significant advantage of the machine 10 that both the side walls 26 and the cutting edge 24 can be adjusted relative to the lower end of the escalator assembly 14.

Referring additionally now to FIG. 7, one of the escalator flight sections 28 is representatively illustrated apart from the remainder of the machine 10. The flight section 28 is shown from a top plan view, with the direction of travel during normal operation of the escalator assembly 14 being indicated by an arrow 86.

In this view it may be seen that the flight section 28 includes a recess 88 which is concave in the direction of travel 86 of the flight section. This concave recess 88 permits wet material 46 to be conveyed more efficiently up the escalator assembly 14, and also aids in urging the material toward the middle of the flight section 28 and away from its lateral sides 90. This helps to prevent the material 46 from collecting at the sides of the escalator assembly 14.

Referring additionally now to FIG. 8, the flight section 28 is depicted from a side elevational view. In this view it may be seen that an upstanding wall 92 is tapered toward the lateral sides 90 of the flight section 28, with the wall having a relatively tall middle portion between its tapered portions.

The tapered portions of the wall 92 also help to prevent accumulation of the material 46 at the sides of the escalator assembly 14. The relatively tall middle portion enables a greater quantity of the material 46 to be conveyed by each of the flight sections 28, thereby increasing the efficiency of the escalator assembly 14.

Note that it is not necessary for all of the flight sections 28 to be configured as depicted in FIGS. 7 & 8. For example, only every other flight section 28 might be configured as depicted in FIGS. 7 & 8, while the remaining flight sections are conventionally configured, etc.

Figure 9A:
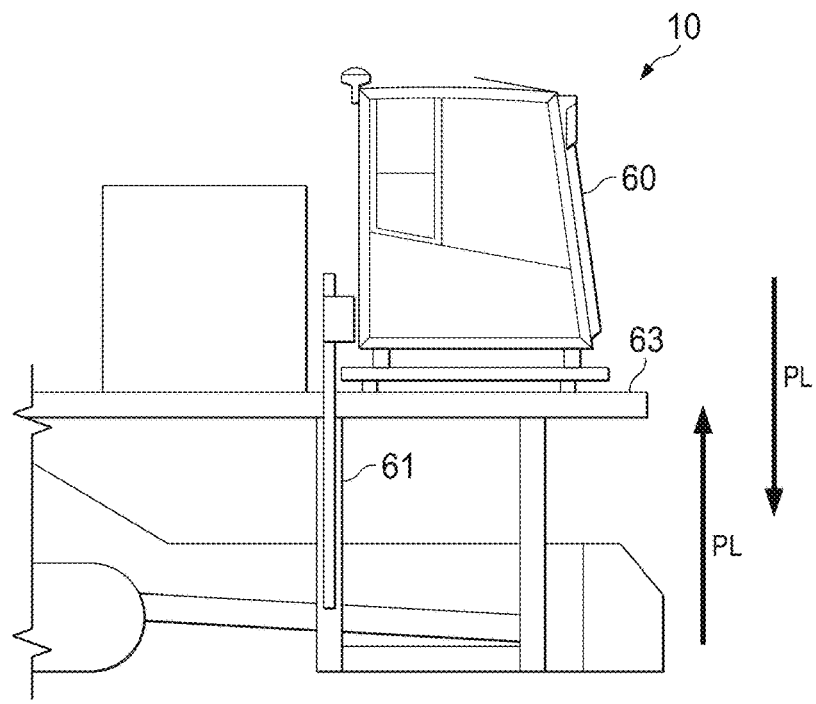
FIG. 9A-9E are side elevational views of an embodiment of a pipeline padding machine with a vertically articulating cab.

FIG. 9A is a side elevational view of an embodiment of a pipeline padding machine 10 with a vertically articulating cab 60. As can be appreciated, the cab 60 can be movable relative to the machine 10. Advantageously, by allowing the cab 60 to move relative to the machine 10, an operator can easily access the cab 60 in various environments while permitting the cab 60 to be positioned in a desired location during operation and/or transportation of the machine 10. Further, in some embodiments, the cab 60 can be of any suitable configuration, include a single sized cabin and/or a double sized cabin.

As illustrated, the cab 60 can be vertically movable relative to the machine 10. For example, the cab 60 can be disposed on a vertically moveable platform 63. The platform 63 can support the cab 60 and translate relative to the machine 10 along a rail 61. The platform 63 can be moved along the rail 61 by any suitable drive mechanism, including chain drives, gear drives, hydraulic actuators, electrical actuators, etc. Optionally, the platform 63 can be counterweighted to balance the load of the cab 60.

During operation, the cab 60 can extend from and retract into the machine 10. During entry of the machine 10, the cab 60 may be lowered to allow for an operator to easily enter or exit the cab 60. In some embodiments, the cab 60 may be lowered any suitable or desired amount to permit access, including but not limited to lowering cab 60 to ground level. During operation, the cab 60 can be elevated to an operating position to allow for greater view for the operation of the machine 10. In some embodiments, the cab 60 can be retracted to a transport position to allow for increased clearance for shipment or transportation.

Figure 9B:
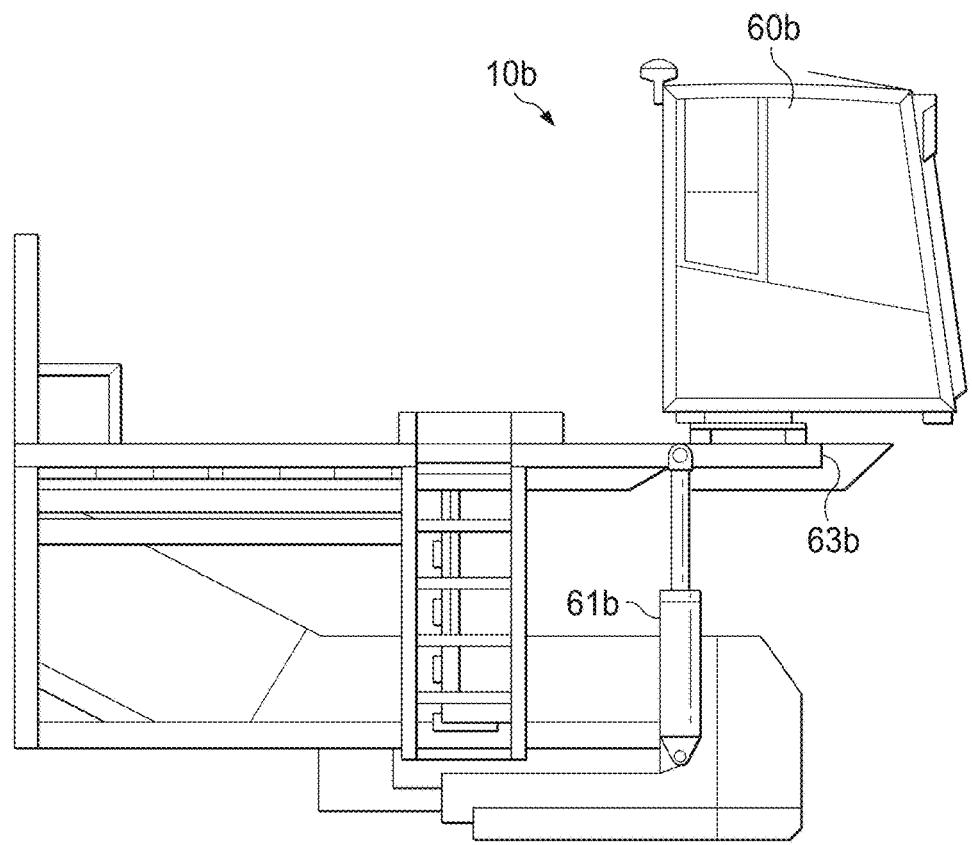
Figure 9C:
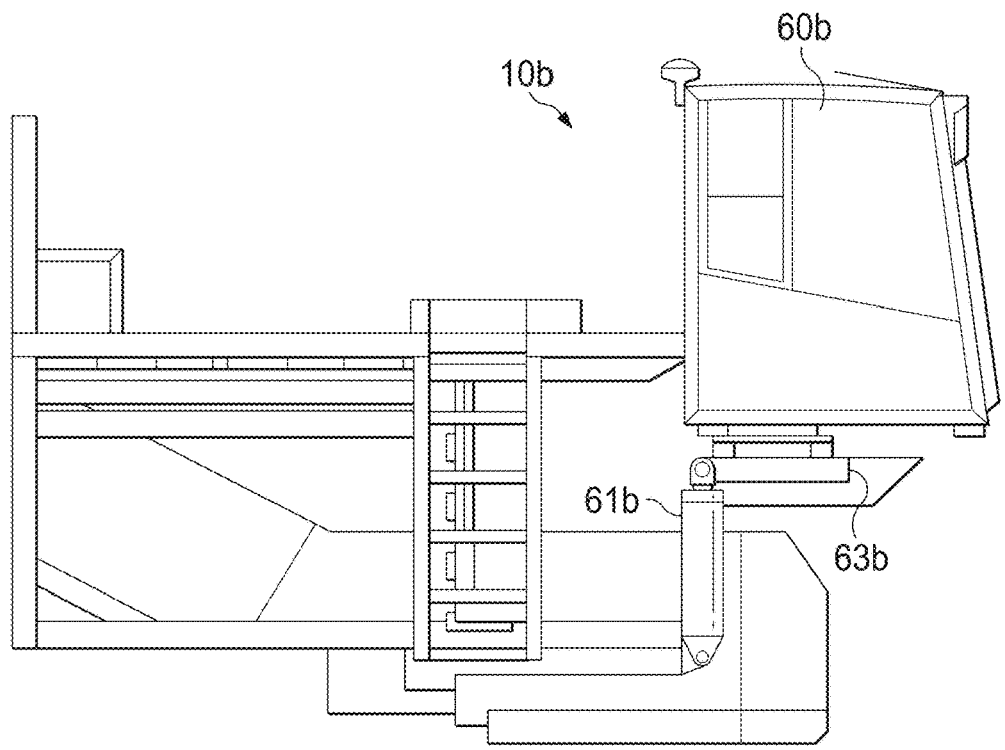

FIGS. 9B and 9C are side elevational views of an embodiment of a pipeline padding machine 10b with a vertically articulating cab 60b. Optionally, the cab 60b can be actuated by a hydraulic actuator or cylinder 61b. As illustrated in FIG. 9B, the cab 60b can be hydraulically actuated to an operation position. In some embodiments, the hydraulic cylinder 61b can be vertically aligned or otherwise aligned with the direction of intended travel. As illustrated in FIG. 9C, the hydraulic cylinder 61b can be retracted to allow the cab 60b to be lowered or retracted for shipping and/or transport. In some embodiments, the hydraulic cylinder 61b can directly actuate the cab 60b. Optionally, the hydraulic cylinder 61b can actuate the cabin basement or platform 63b.

Figure 9D:
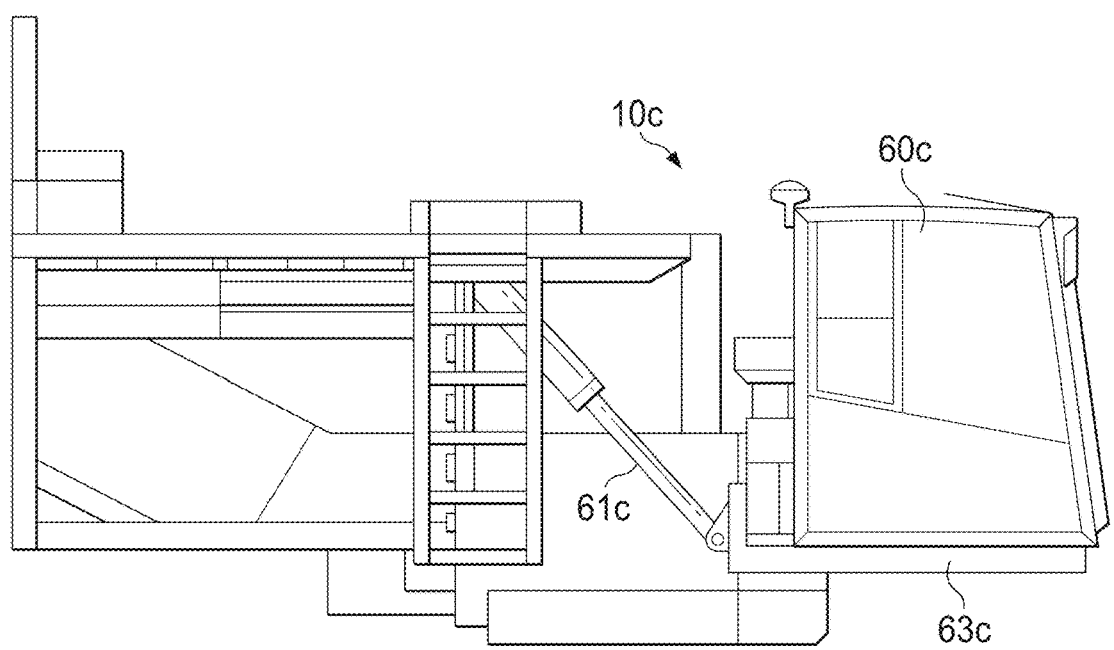
Figure 9E:
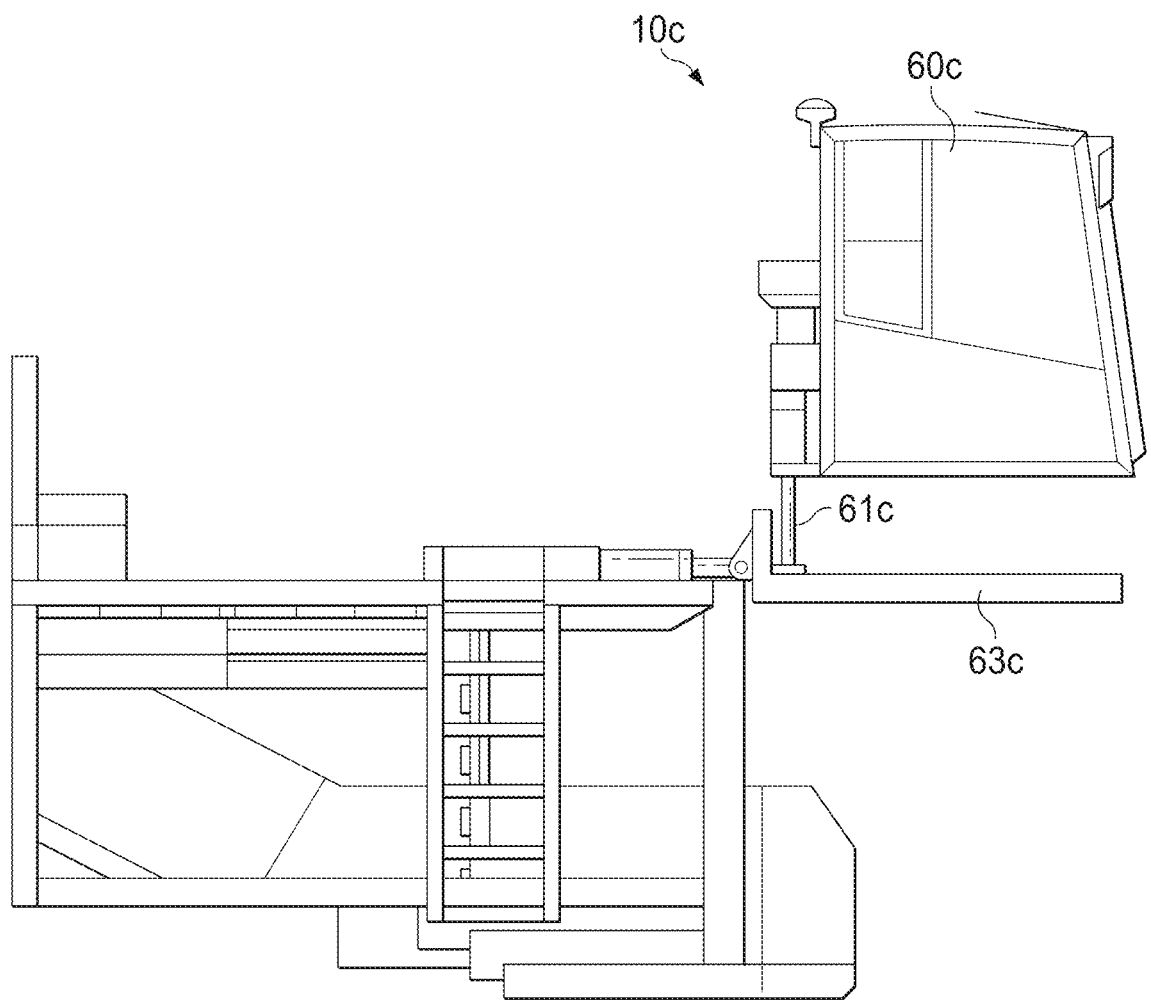

FIGS. 9D and 9E are side elevational views of an embodiment of a pipeline padding machine 10c with a vertically articulating cab 60c. Optionally, the cab 60c can be actuated by a diagonally disposed or aligned hydraulic actuator or cylinder 61c. The hydraulic cylinder 61c can be rotatably attached to the cab 60c and/or the platform 63c to allow the vertical movement of the cab 60c as the hydraulic cylinder 61c is actuated.

Figure 10A:
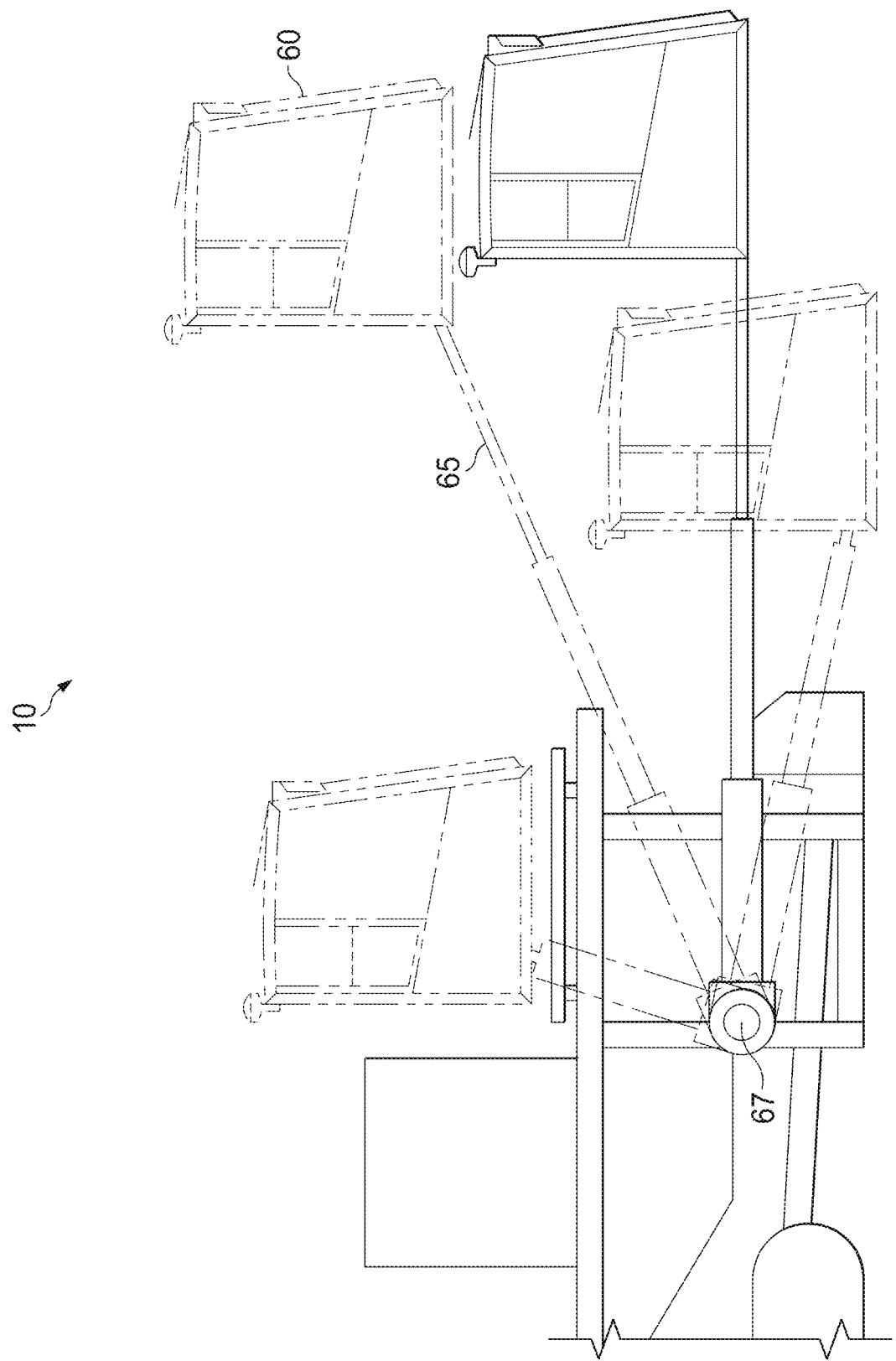
FIG. 10A is a side elevational view of an embodiment of a pipeline padding machine with a rotatable extension arm.

FIG. 10A is a side elevational view of an embodiment of a pipeline padding machine 10 with a telescoping extension arm 65. In some embodiments, the cab 60 can be moveable via an extension arm 65. As can be appreciated, the extension arm 65 can move the cab 60 away from the machine 10 by telescopically actuating a plurality of extension members of the extension arm 65. Further, the extension arm 65 can move the cab 60 toward the machine 10 by retracting the extension members of the extension arm 65. Optionally, the extension arm 65 can be hydraulically and/or electrically powered.

In some embodiments, the extension arm 65 can be rotated about a pivot 67 coupled to the machine to allow the cab 60 to move horizontally and/or vertically relative to the machine 10. For example, if the extension arm 65 is rotated to be parallel or near parallel to the ground, the cab 60 can be extended in a mostly horizontal direction when the extension arm 65 is extended. Further, if the extension arm 65 is rotated to be perpendicular or near perpendicular to the ground, the cab 60 can be extended in a mostly vertical direction when the extension arm 65 is extended. As illustrated, the extension arm 65 can be rotated at the pivot 67 to a desired angle to allow the cab 60 to extend or retract to a desired position with a horizontal component and a vertical component relative to the machine 10.

Figure 10B:
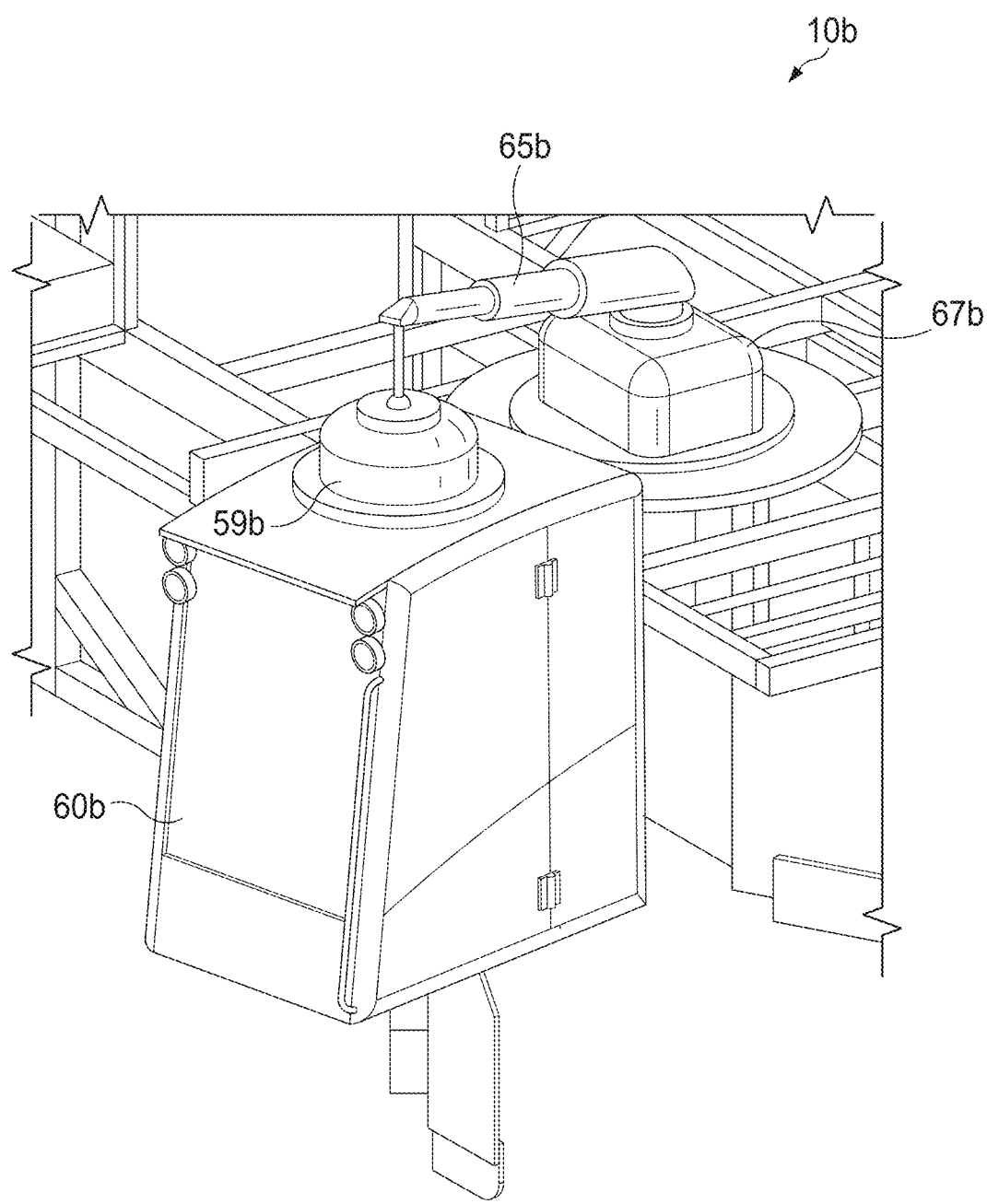
FIG. 10B is a partial perspective view of an embodiment of a pipeline padding machine with a telescoping extension arm.
Figure 10C:
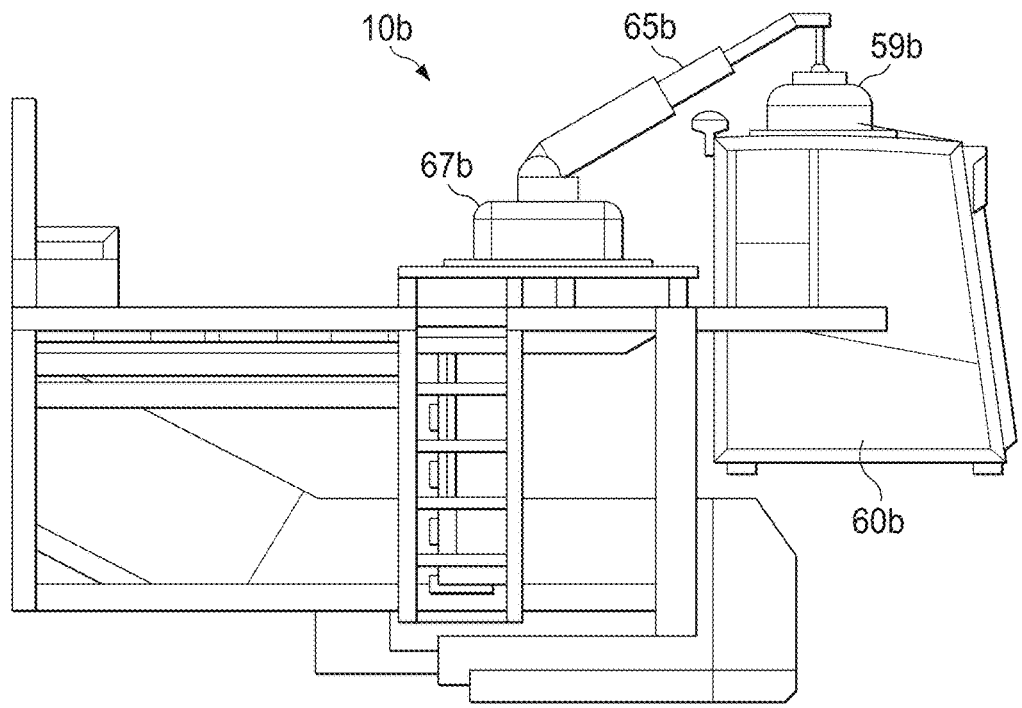
FIGS. 10C and 10D are side elevational views of an embodiment of a pipeline padding machine with a telescoping extension arm.
Figure 10D:
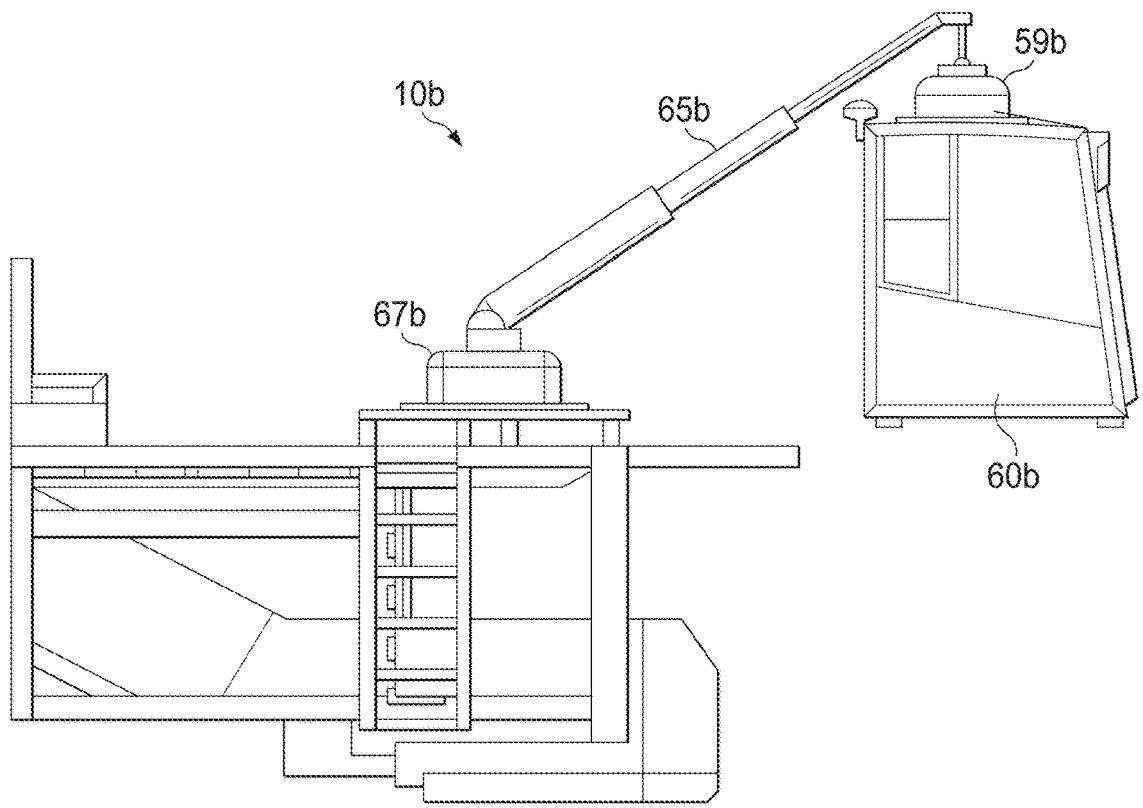
Figure 10E:
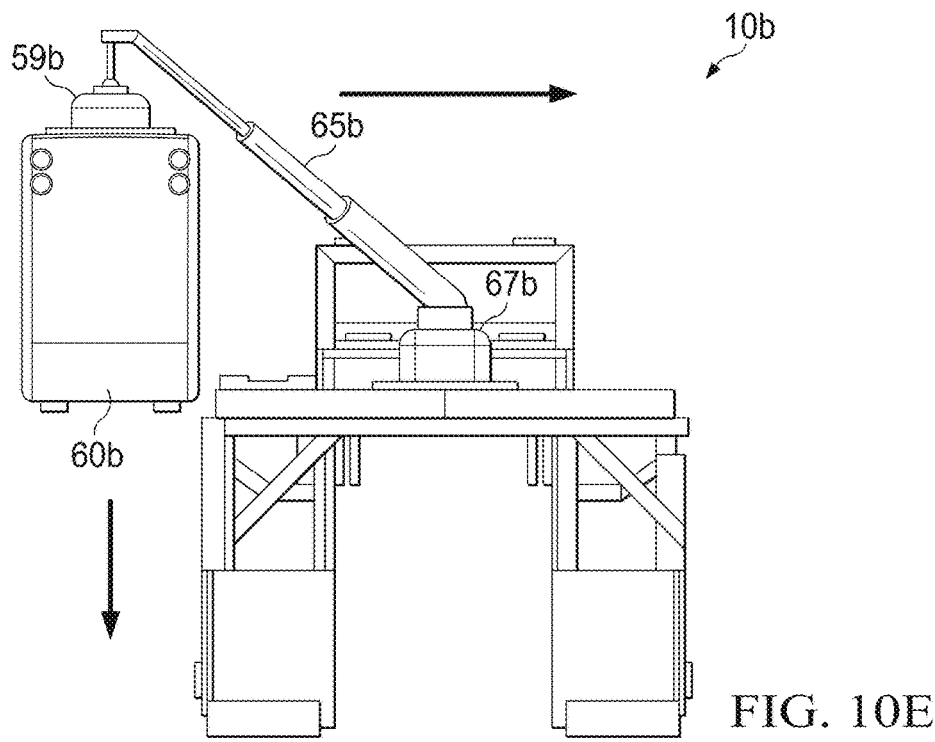
FIG. 10E is a front elevational view of an embodiment of a pipeline padding machine with a telescoping extension arm.

FIG. 10B is a partial perspective view of an embodiment of a pipeline padding machine 10b with a telescoping extension arm 65b. FIGS. 10C and 10D are side elevational views of an embodiment of a pipeline padding machine 10b with a telescoping extension arm 65b. FIG. 10E is a front elevational view of an embodiment of a pipeline padding machine 10b with a telescoping extension arm 65b. With reference to FIG. 10B, in the depicted example, the extension arm 65b can attach to an upper portion of the cab 60b. In some embodiments, the extension arm 65b can be rotatably coupled to the cab 60b with a rotational coupling 59b. During operation, the rotational coupling 59b can allow for the cab 60b to rotate relative to the extension arm 65b.

In some embodiments, the extension arm 65b can be rotationally coupled to the machine 10b with a rotational coupling 67b. Similar to pivot 67 described with respect to FIG. 10A, the rotational coupling 67b can vertically pivot to allow the cab 60b to move horizontally and/or vertically relative to the machine 10b. For example, with reference to FIG. 10C, the cab 60b can be horizontally and vertically retracted toward the machine 10b for shipping or transportation. With reference to FIG. 10D, the cab 60b can be unlocked from a shipping position and raised and extended into an operation position.

With reference to FIG. 10E, optionally, the rotational coupling 67b can horizontally rotate to allow the cab 60b to move laterally relative to the machine 10b. In additional to moving horizontally and/or vertically relative to the machine 10b as described above, the cab 60b can translate laterally (as observed from the front of the machine 10b) by rotating the rotational coupling 67b. During operation, the rotational coupling 67b can rotate from left to right (or vice versa) to move the extension arm 65b and the cab 60b from left to right (or right to left). In some embodiments, the rotational coupling 59b may rotate the cab 60b as desired as the extension arm 65b is rotated.

Figure 11A:
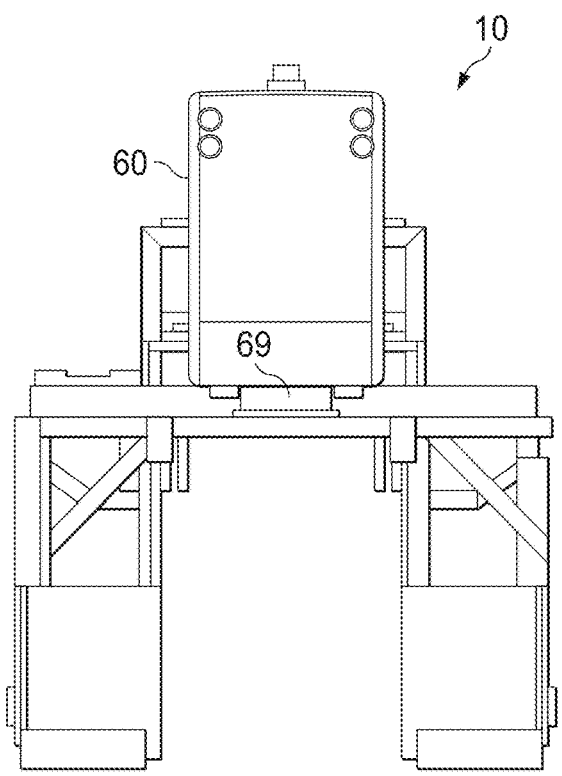
FIGS. 11A-11C are front elevational views of an embodiment of a pipeline padding machine with a horizontally translating cab.
Figure 11B:
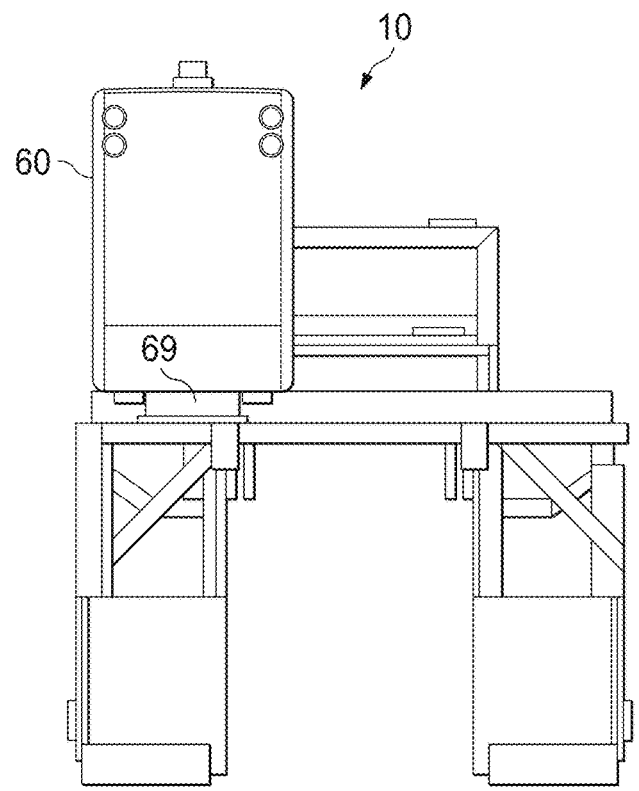
Figure 11C:
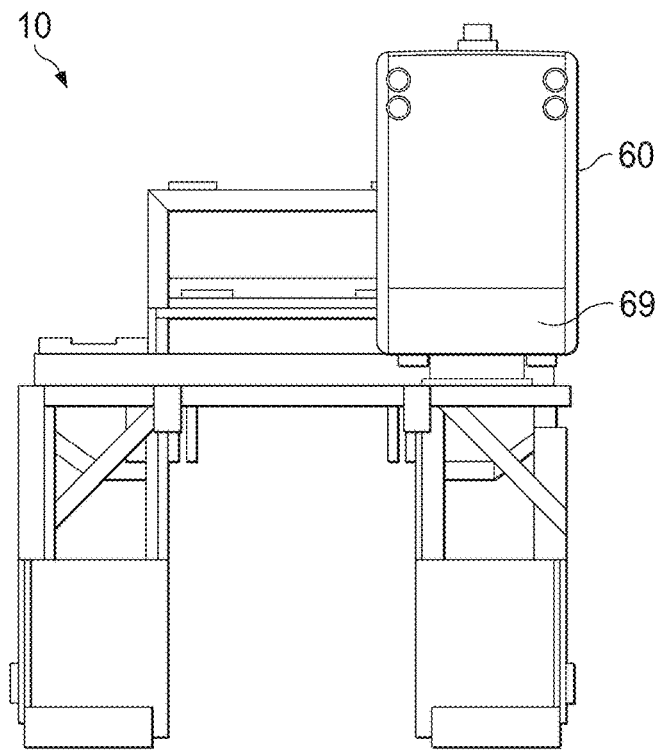

FIGS. 11A-11C are front elevational views of an embodiment of a pipeline padding machine 10 with a horizontally translating cab 60. In some embodiments, the cab 60 can be horizontally or laterally movable relative to the machine 10. For example, in some embodiments, the cab 60 can be movable via a translating platform 69 that is coupled to the machine 10. The translating platform 69 can slide or otherwise be actuated on rails by an electrical and/or hydraulic actuator. In other embodiments, the cab 60 can otherwise be laterally movable relative to the machine 10. Advantageously, the cab 60 can be moved laterally to allow an operator to access the cab from either side of the machine, facilitating the machine to operate from either side of a ditch.

Figure 12A:
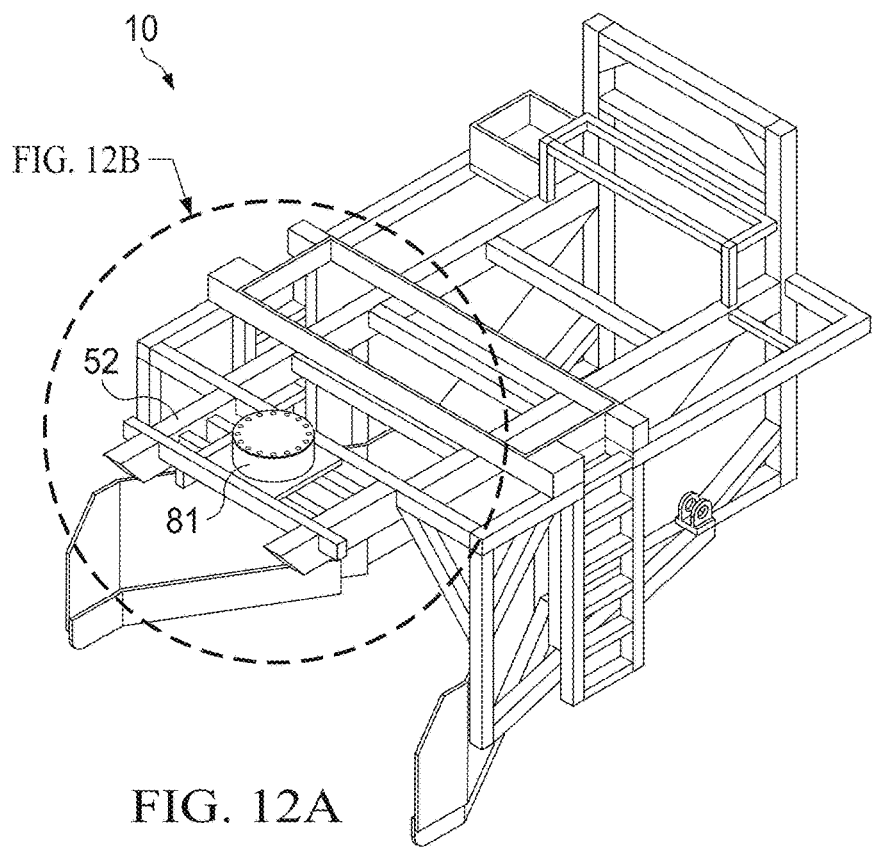
FIGS. 12A and 12B are isometric views of an embodiment of a pipeline padding machine with a rotating pedestal.
Figure 12B:
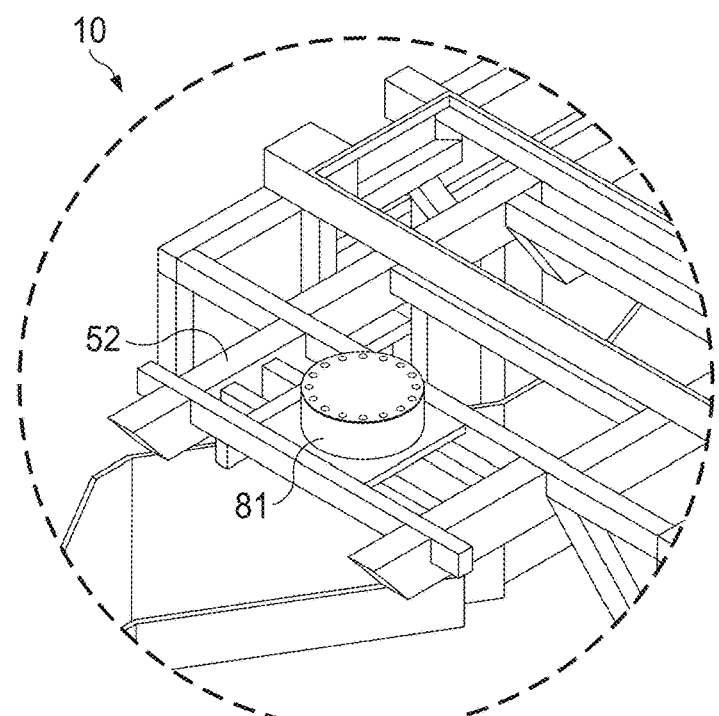
Figure 12C:
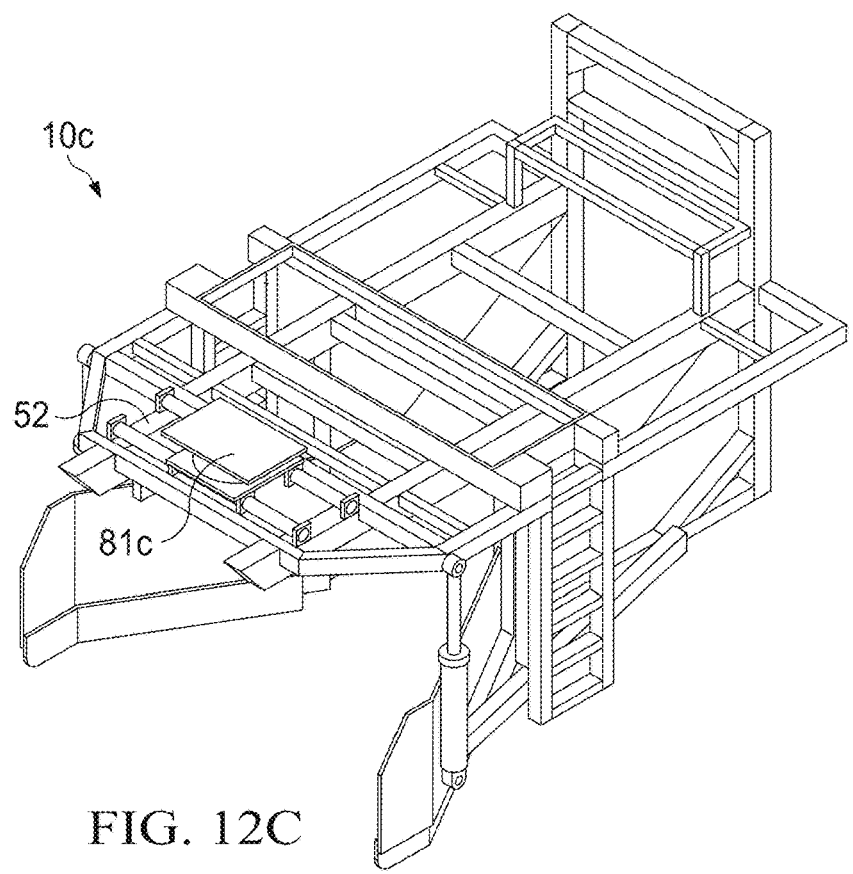
FIG. 12C is an isometric view of an embodiment of a pipeline padding machine with a rotating pedestal.

FIGS. 12A and 12B are isometric views of an embodiment of a pipeline padding machine 10 with a rotating pedestal 81. In the depicted example, the pipeline padding machine 10 can include a rotating pedestal 81 for use with a cab 60. The rotating pedestal 81 can be coupled to the frame 52 of the machine 10 or alternatively to a platform upon which cab 60 is mounted. For example, rotating pedestal 81 could be mounted on translating platform 69 of the embodiment discussed above and shown in FIGS. 11A-11C, as discussed in more detail below. The rotating pedestal 81 can rotate via an electric motor or any other suitable actuation device. FIG. 12C is an isometric view of an embodiment of a pipeline padding machine 10c with a rotating pedestal 81c. In the depicted example, another embodiment of the rotating pedestal 81c is shown. As can be appreciated, the rotating pedestal 81c can allow for a cab to rotate. Further, the rotating pedestal 81-c can be translated, allowing for translation of a cab attached thereto.

FIGS. 13A-13D are isometric views of an embodiment of a pipeline padding machine with a cab coupled to the rotating pedestal of FIGS. 12A and 12B and combined with translating platform 69 of the embodiment shown in FIGS. 11A-11C. Advantageously, in conjunction with the rotating pedestal 81, the cab 60 can be rotated relative to the machine 10 about a vertical axis that is substantially perpendicular to the ground on which the machine is located. In this way, the rotating pedestal may allow the operator access to a broader range of viewing angles from the cabin, allowing for more effective operation of the pipeline padding machine.

For example, the cab 60 can be rotated 180 degrees relative to the machine 10. Optionally, the cab 60 can be rotated in either direction. For example, the cab 60 can be coupled to a pivot or otherwise rotationally coupled to the machine 10 to permit the cab 60 to swivel or rotate as needed. Advantageously, the cab 60 can be rotated to permit the operator to have a desired view or vantage of operation. In some embodiments, the cab 60 can include an operator chair that rotates within the cab 60. In some embodiments, the chair can rotate independently of the cab. The chair can be rotated manually, hydraulically, with an electric motor, or any other suitable actuator.

As can be appreciated, the cab 60 can be movable in a desired combination of vertically, horizontally, and/or rotationally to orientate the cab 60 relative to the machine 10. In some applications, the cab 60 can be moved diagonally, (i.e. vertically and horizontally) to allow the cab 60 to be moved to permit operator access. For example, as shown in FIGS. 13A-13D, the cab 60 can be rotated and horizontally translated.

Figure 13A:
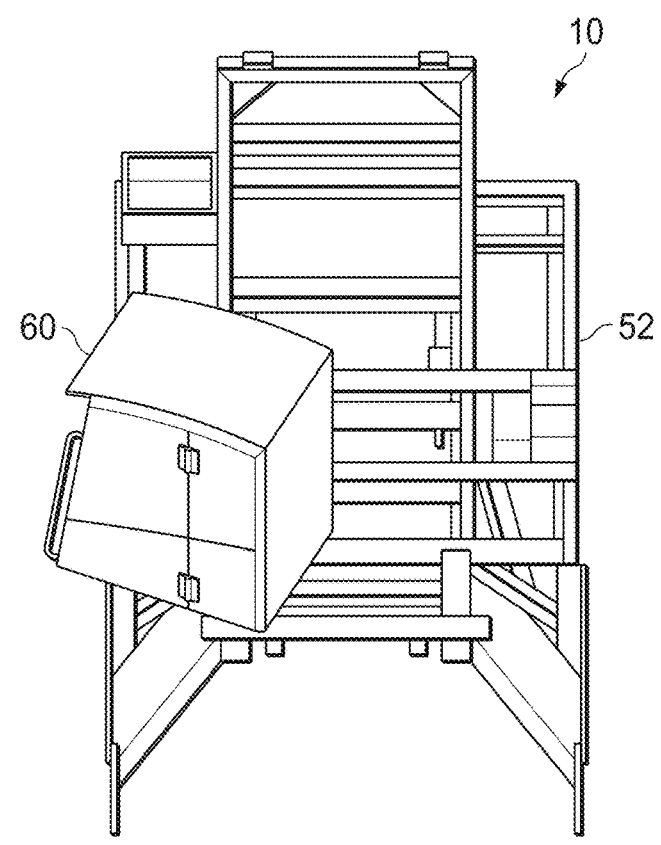
FIGS. 13A-13D are isometric views of an embodiment of a pipeline padding machine with a cab coupled to the rotating pedestal of FIGS. 12A and 132.
Figure 13B:
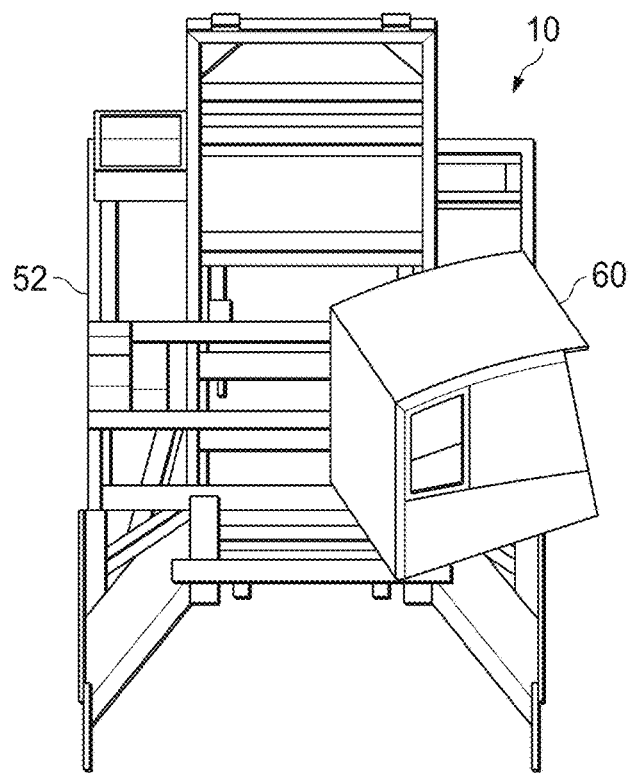
Figure 13C:
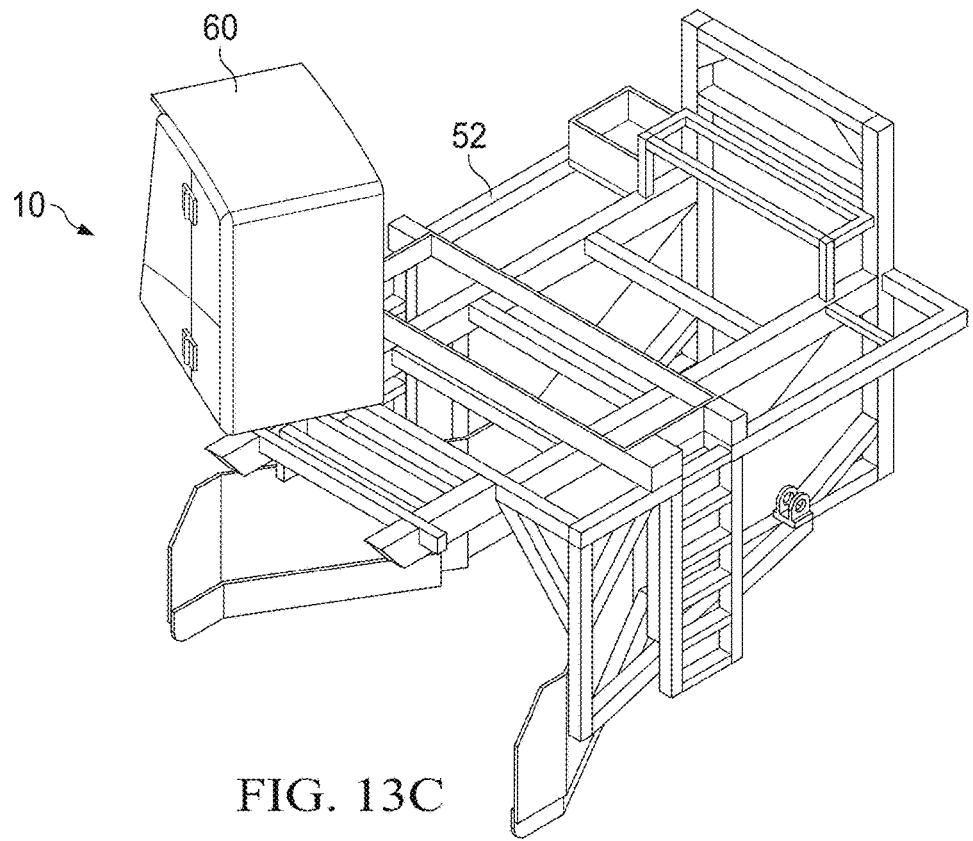
Figure 13D:
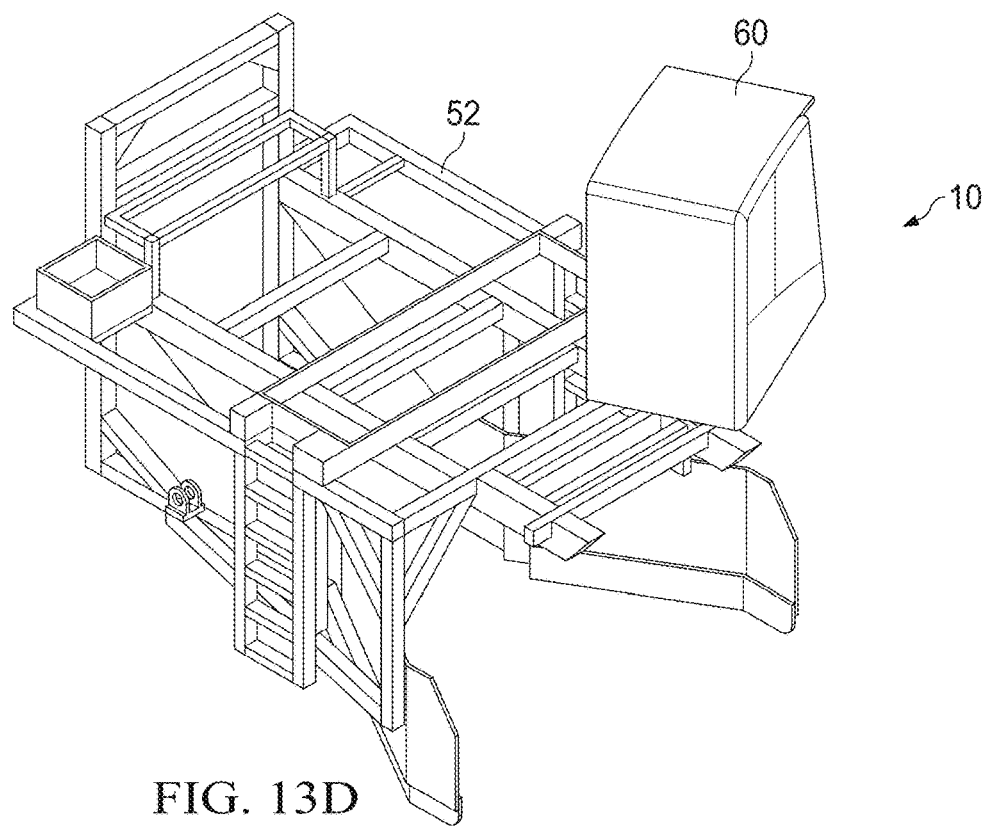
Figure 13E:
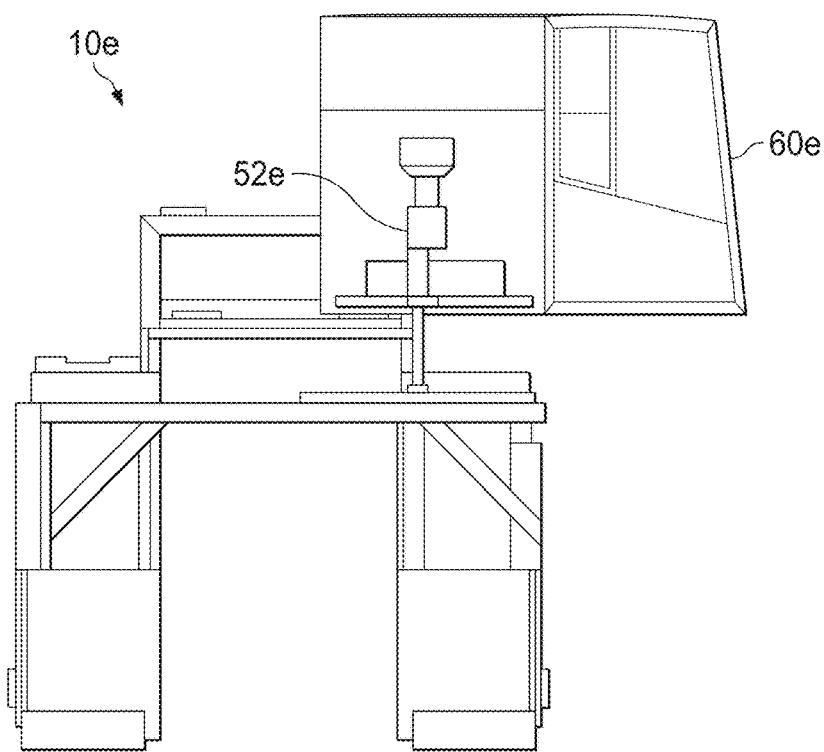
FIG. 13E is a front elevation view of an embodiment of a pipeline padding machine with a rotating hydraulic cylinder.

FIG. 13E is a front elevation view of an embodiment of a pipeline padding machine 10e with a rotating hydraulic cylinder 52e. As can be appreciated, the cab 60e can rotate relative to the machine 10e by rotating about the cylinder 52e. In some embodiments, the cab 60e can rotate about 270 degrees to allow the operator to face a desired direction.

Figure 14A:
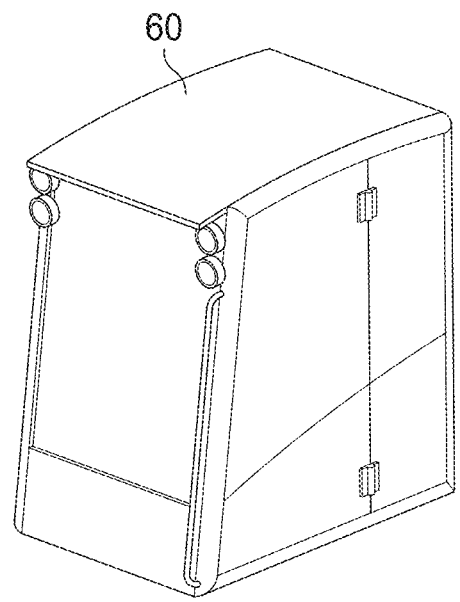
FIGS. 14A and 14B are isometric views of embodiments of a cab for a pipeline adding machine.
Figure 14B:
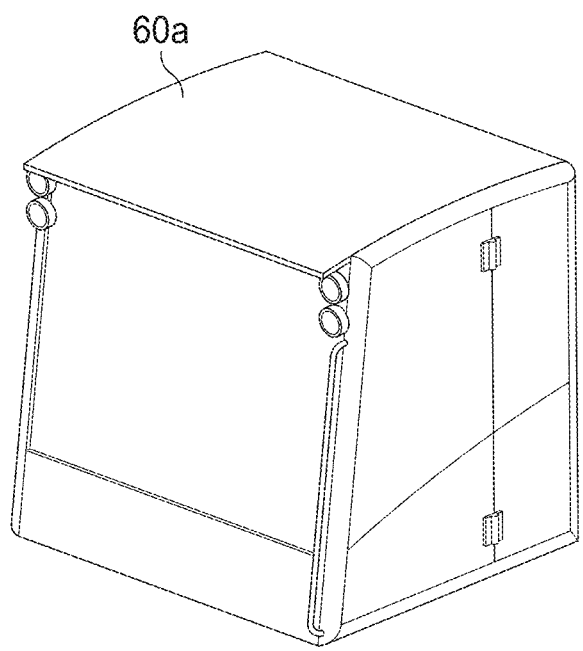

FIGS. 14A and 14B are isometric views of embodiments of a cab 60 for a pipeline adding machine 10. As illustrated in FIG. 14A the cab 60 can be a single sized cabin. As illustrated in FIG. 14B, the cab 60a can be a double sized cabin. Advantageously, the configuration and the size of the cabin can be selected based on an intended application of the machine 10.

Figure 15:
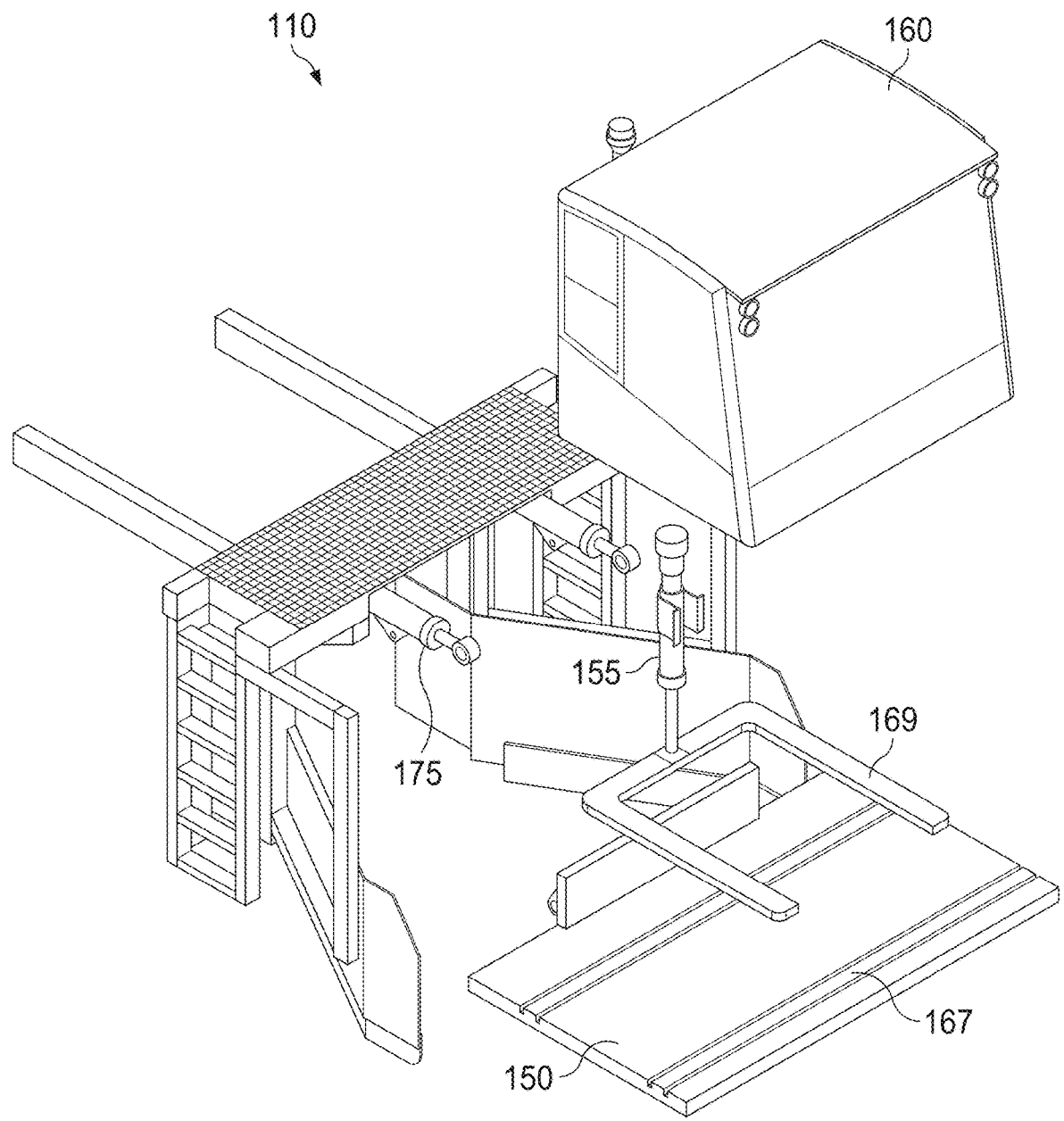
FIG. 15 is an exploded perspective view of an embodiment of a pipeline padding machine.

FIG. 15 is an exploded perspective view of an embodiment of a pipeline padding machine 110. As can be appreciated, the actuators and mechanisms described herein can be used alone or in combination to provide a desired range of motion of the cab 160. For example, the machine 110 can utilize a combination of a moveable platform 150, a rotating hydraulic cylinder 155, a horizontally translatable sub-platform 169 that engages with rails 167, and/or one or more extension arms 175 to rotate and/or translate the cab 160 as desired. In some embodiments, any suitable combination of actuators and mechanisms can be utilized as needed.

Figure 16:
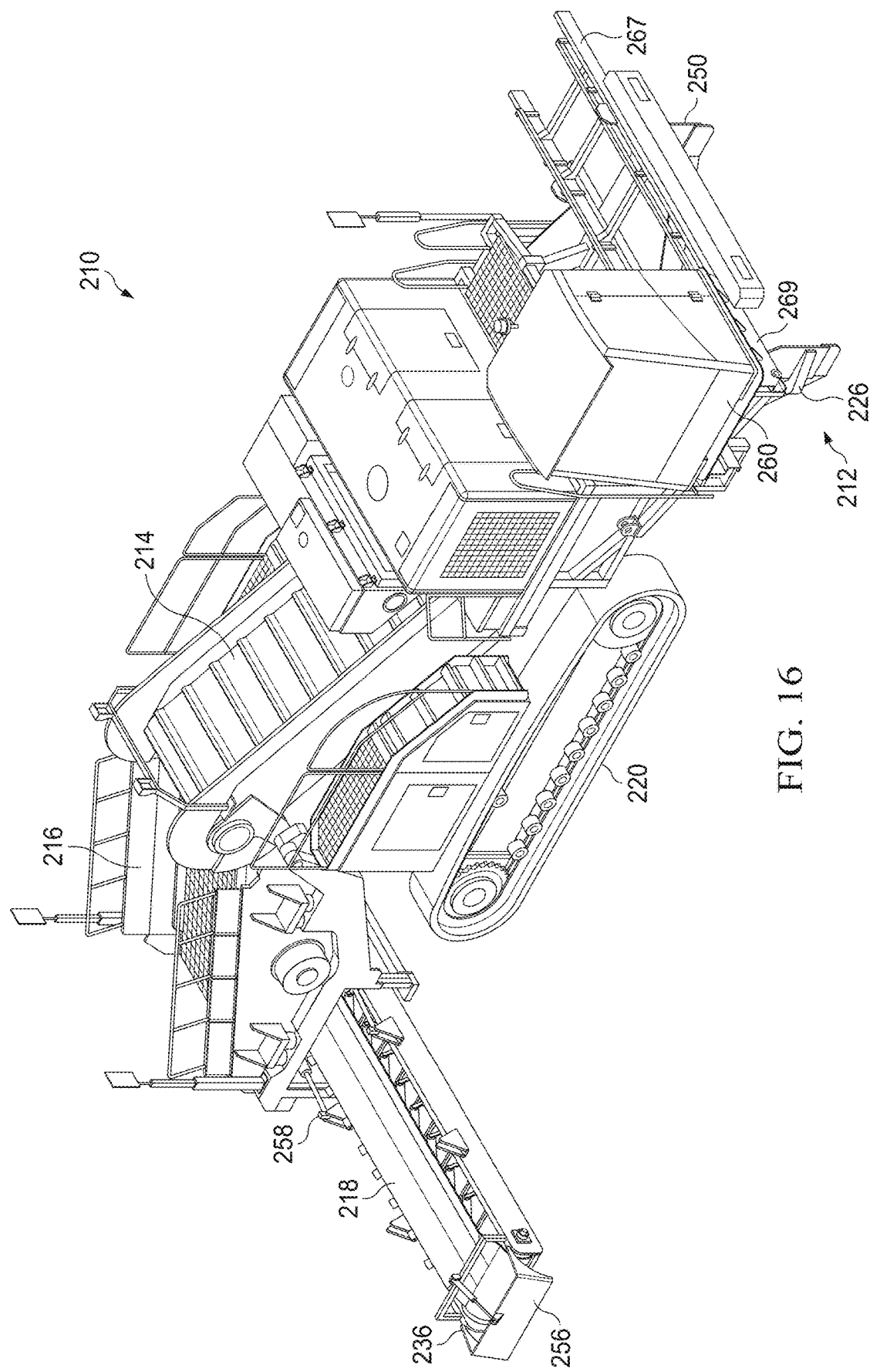
FIG. 16 is a perspective view of an embodiment of a pipeline padding machine.
Figure 17:
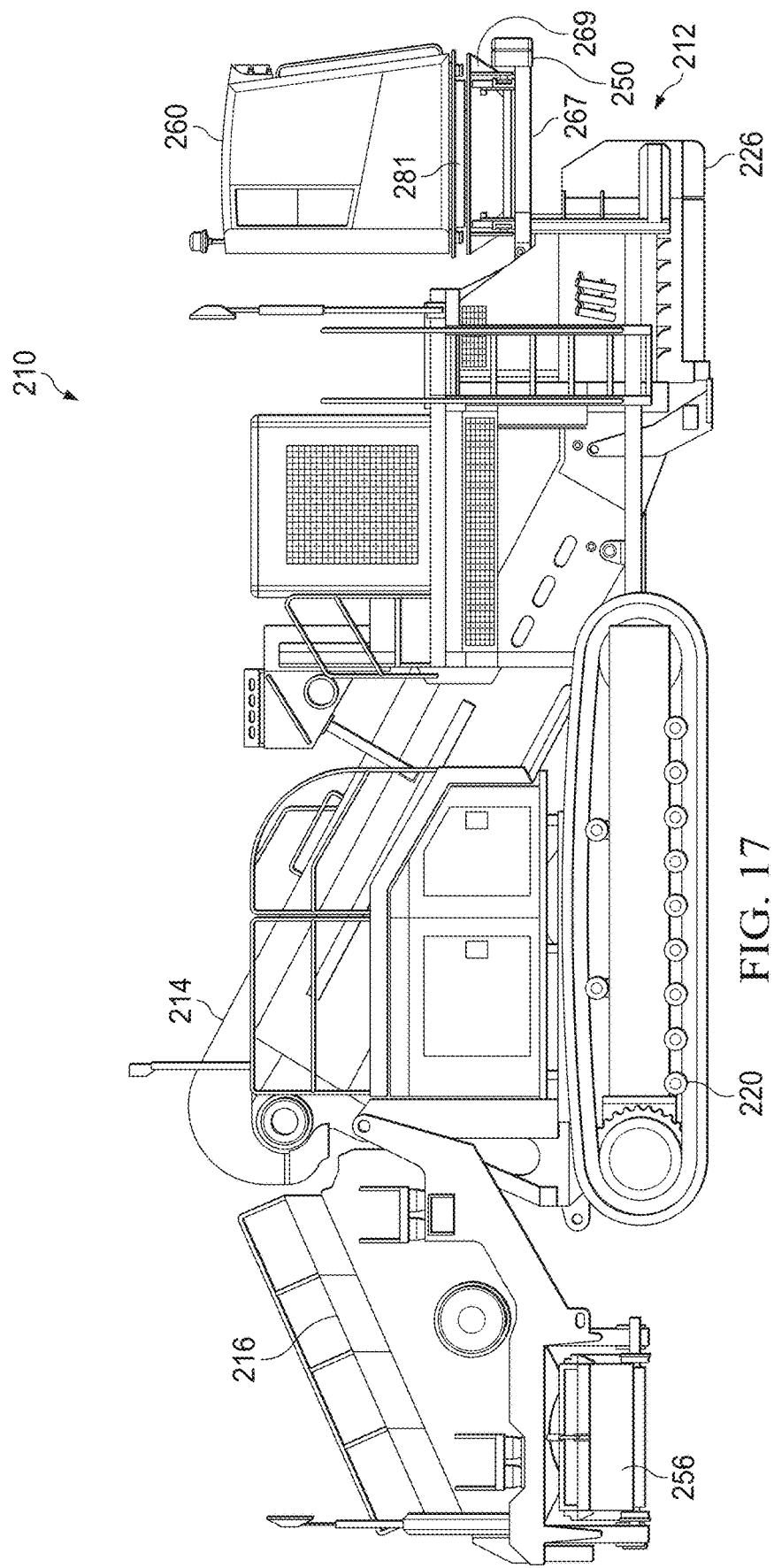
FIGS. 17-19 are side elevation views of the pipeline padding machine of FIG. 16.
Figure 18:
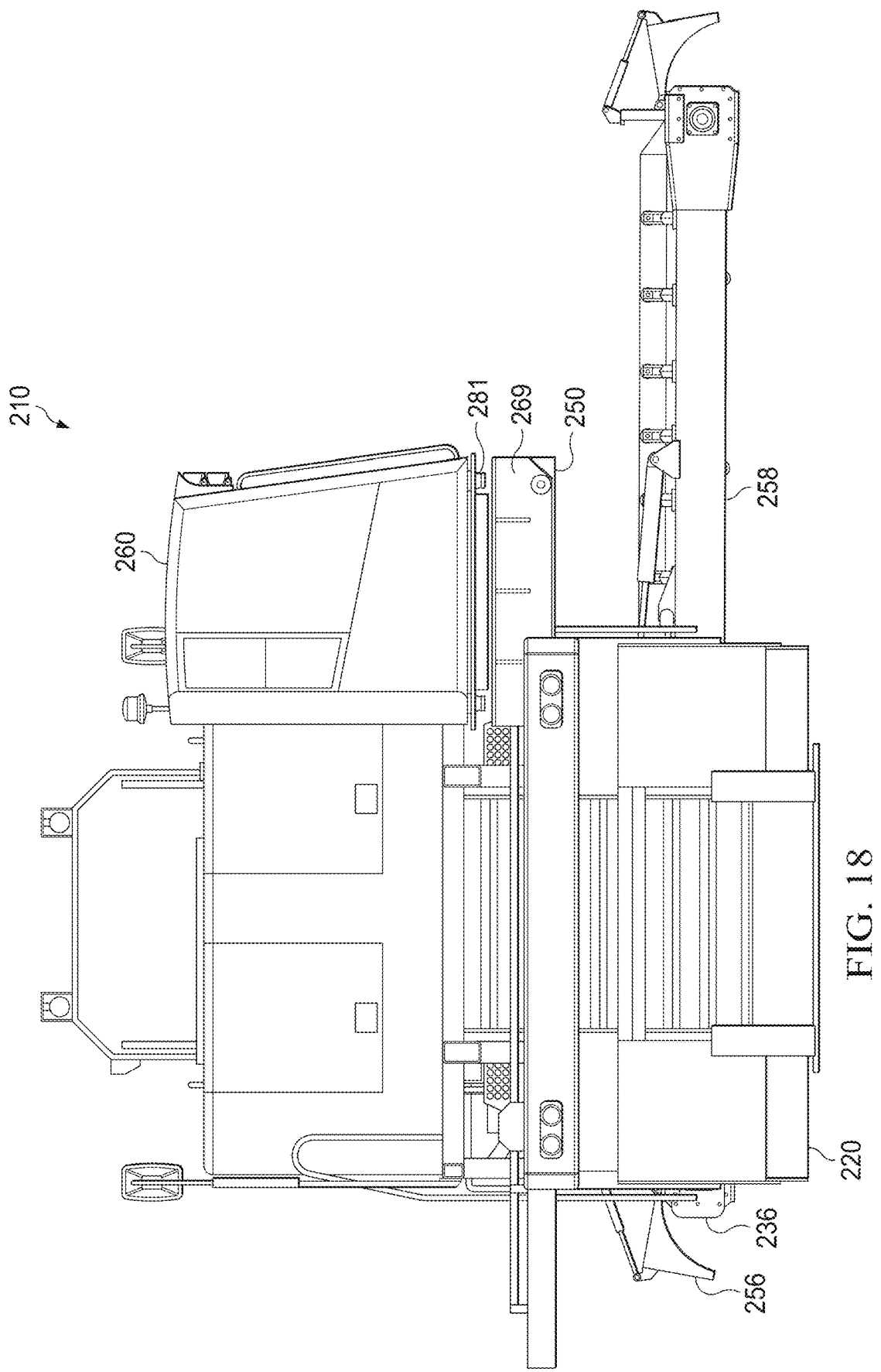
Figure 19:
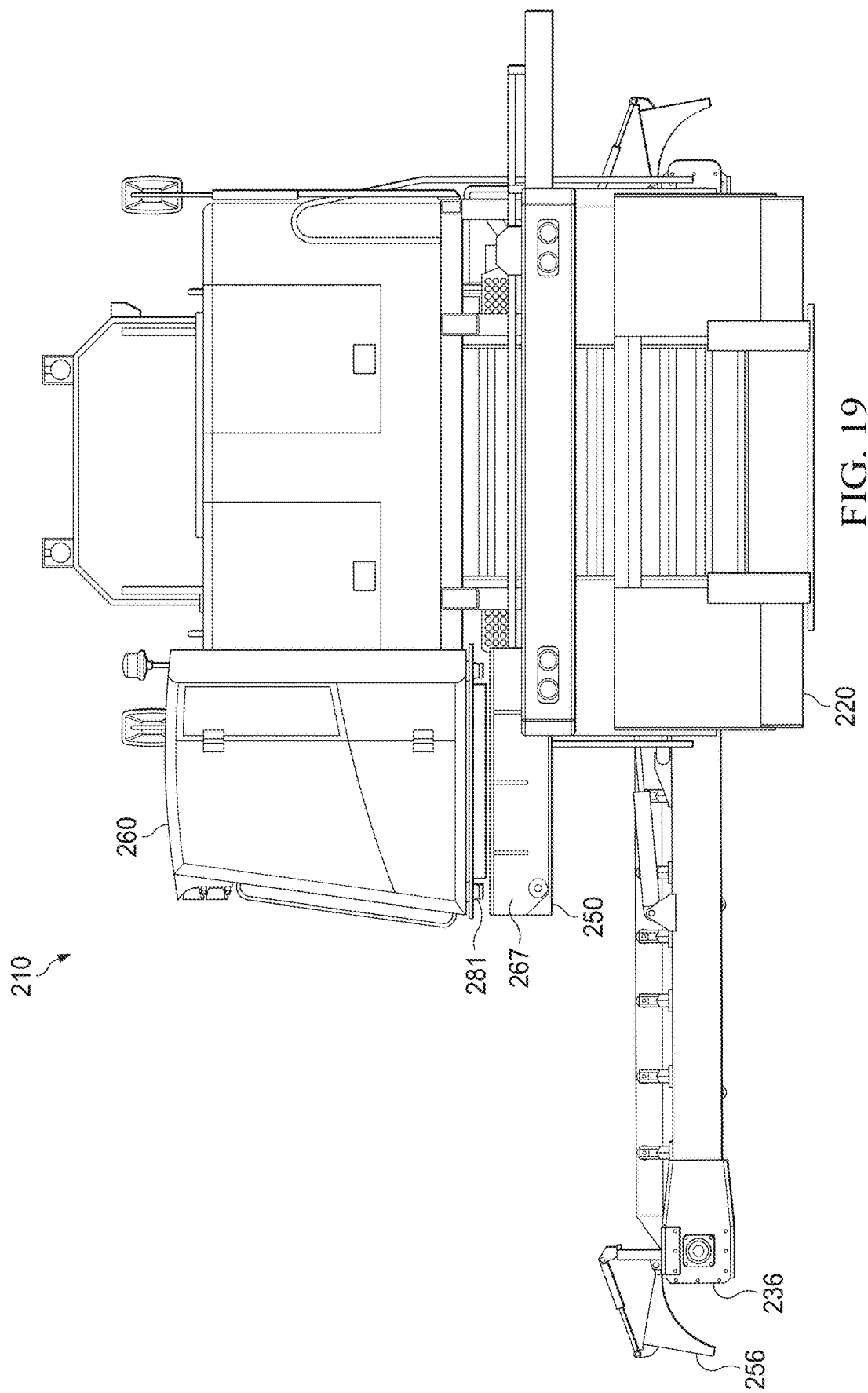

FIG. 16 is a perspective view of an embodiment of a pipeline padding machine 210. FIGS. 17-19 are side elevation views of the pipeline padding machine 210 of FIG. 16. The pipeline padding machine 210 includes features that are similar to the pipeline padding machine 10 and the pipeline padding machine 110. Therefore, unless noted, similar features are identified by similar reference numerals.

With reference to FIGS. 16-19, the pipeline padding machine 210 can utilize the actuators and mechanisms described herein, either alone or in combination to provide a desired range of motion to the cab 260. For example, the cab 260 can be coupled to a rotary pedestal 281. In some embodiments, rotary pedestal 281 can rotate the cab 260 about an axis generally perpendicular to the ground. The rotary pedestal 281 can rotate the cab 260 up to 360 degrees, 300 degrees, 270 degrees, 220 degrees, 180 degrees, 120 degrees, etc. As can be appreciated, the rotary pedestal 281 can be rotated by an electric motor or actuator, a hydraulic actuator, and/or any other suitable actuator.

In some embodiments, a sub-platform 269 can horizontally translate the cab 260 left and/or right relative to the pipeline padding machine 210. Optionally, the sub-platform 269 can translate the rotary pedestal 281 with the cab 260. The sub-platform 269 can be translated along one or more rails 267. In some embodiments, the rails 267 can extend along the width of the pipeline padding machine 210, allowing the sub-platform 269 and therefore the cab 260 to travel the width of the pipeline padding machine 210. Optionally, the rails 267 can extend along a width greater than other portions of the pipeline padding machine 210, allowing the cab 260 to extend past other portions of the pipeline padding machine 210. In some embodiments, the sub-platform 269 can be translated or moved along the rails 267 by an electric motor or actuator, a hydraulic actuator, and/or any other suitable actuator.

In some embodiments, a platform 250 can vertically translate the cab 260 up and down relative to the pipeline padding machine 210 and/or the ground. As illustrated, the platform 250 can extend from the pipeline padding machine 210 and can be coupled to the rails 267, allowing the platform 250 to move the rails 267 when moving the platform 250. As can be appreciated, by moving the rails 267, the sub-platform 269, along with the cab 260 can be vertically translated. Optionally, the platform 250 can include rails, sliders, or another suitable extension mechanism to translate the platform 250. In some embodiments, the platform 250 can be translated or moved vertically by an electric motor or actuator, a hydraulic actuator, and/or any other suitable actuator.

During operation, the platform 250 can lower the cabin 260 to allow for an operator to easily enter or exit the cab 260. In some embodiments, the cab 260 may be lowered any suitable or desired amount to permit access, including but not limited to lowering cab 260 to ground level. During operation, the cab 260 can be elevated to an operating position to allow for greater view for the operation of the machine 210. In some embodiments, the cab 260 can be retracted to a transport position to allow for increased clearance for shipment or transportation.

As can be appreciated, the cab 260 can be moved by one or more of the rotary 281, the translation of the sub-platform 269, and/or the translation of the platform 250. For example, in some embodiments, a pipeline padding machine may include a rotary pedestal 281 and a platform 250. In some embodiments, a pipeline padding machine may include a sub-platform 269 and a platform 250. In some embodiments, the pipeline padding machine may include a rotary pedestal 281 and a sub-platform 269.

Figure 20:
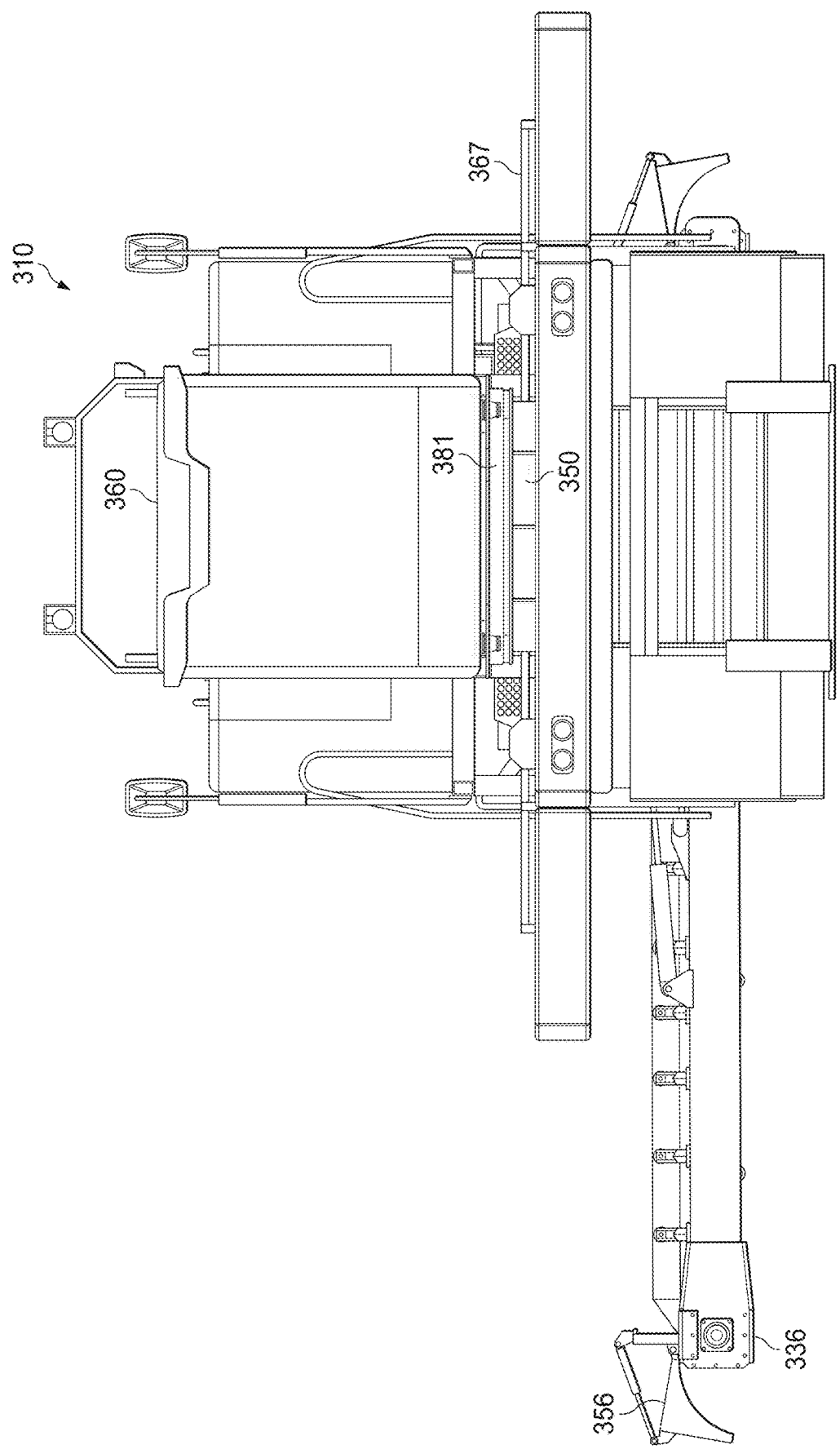
FIG. 20 is a front elevation view of an embodiment of a pipeline padding machine.
Figure 21:
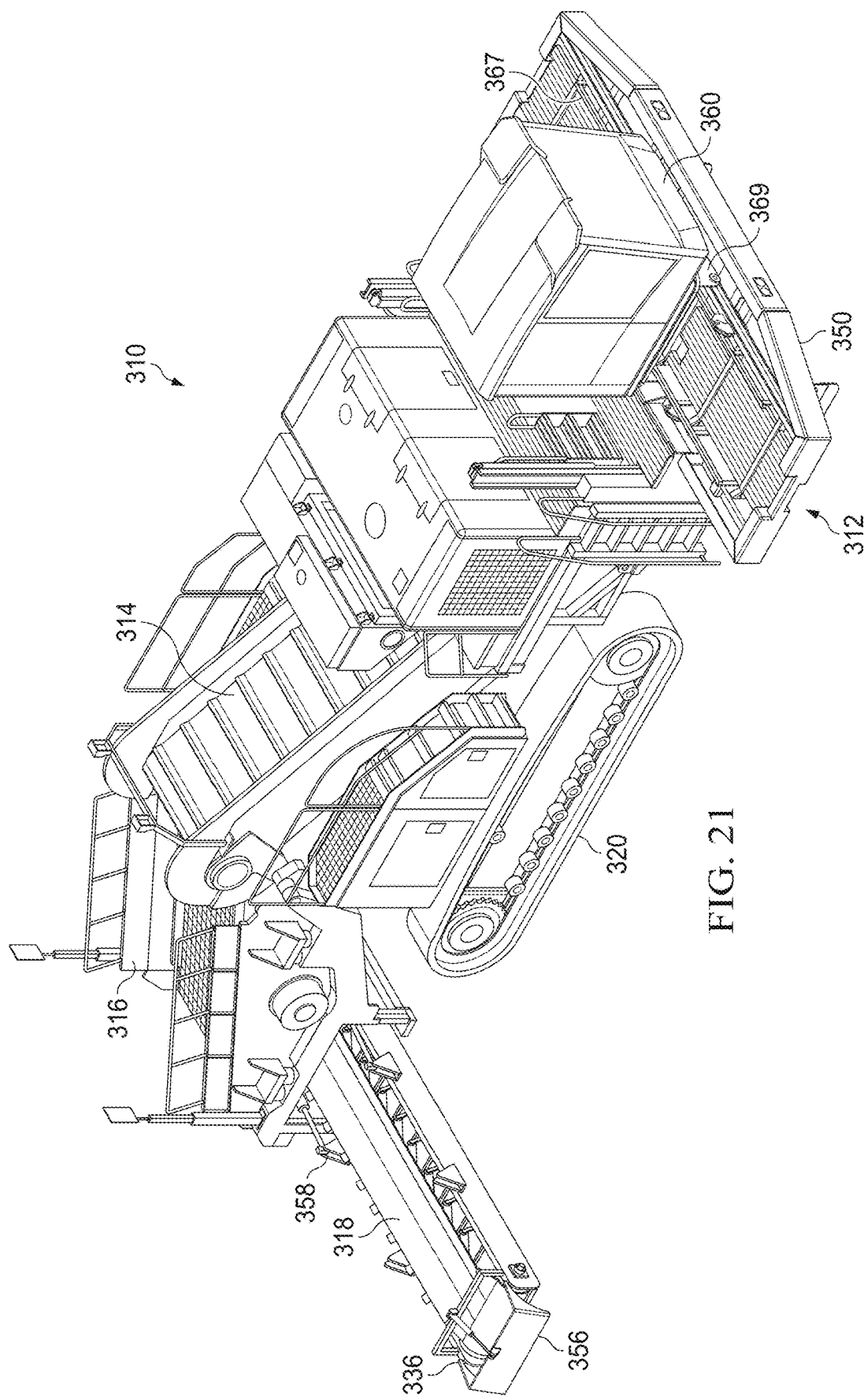
FIG. 21 is a perspective view of the pipeline padding machine of FIG. 20.
Figure 22:
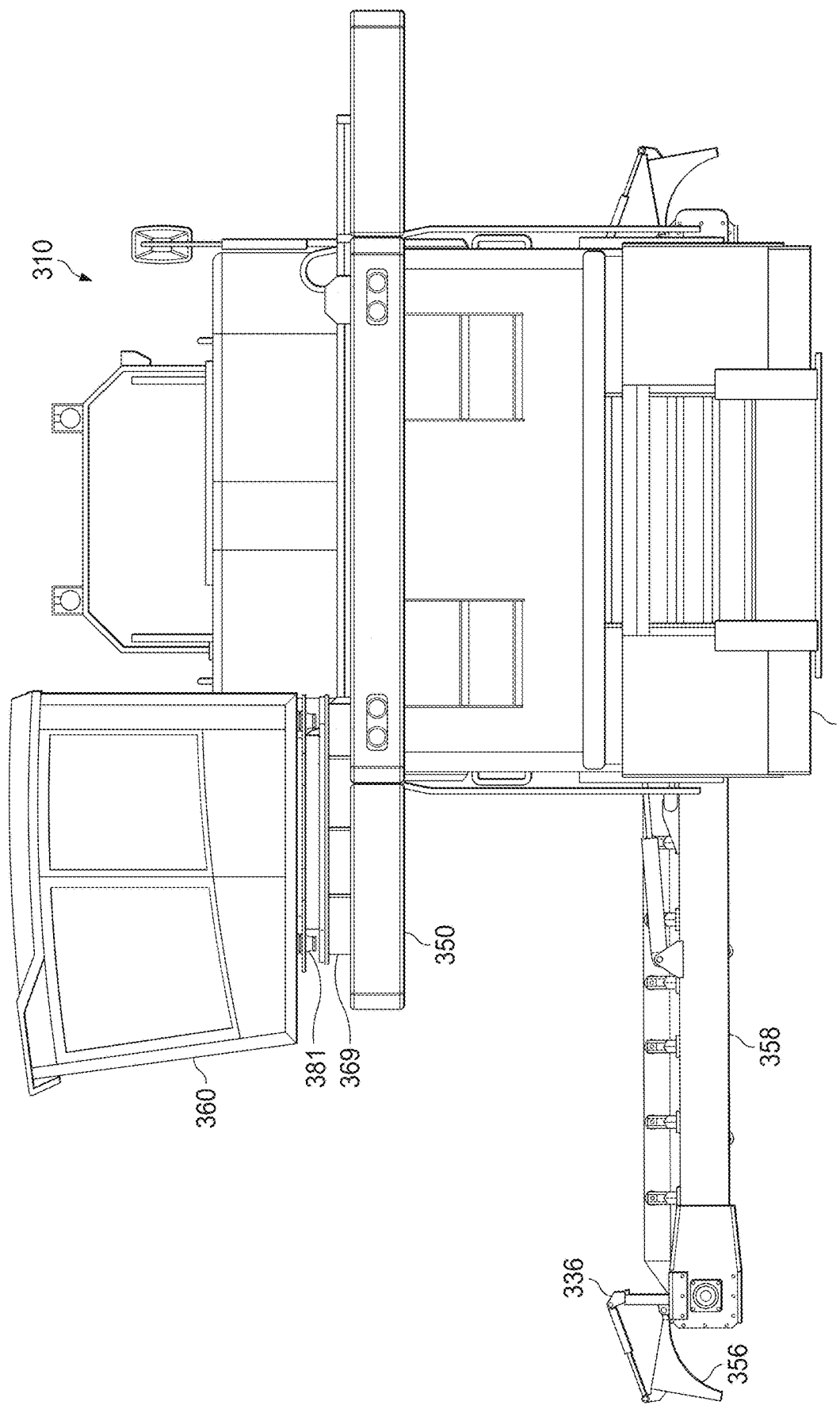
FIG. 22 is a side elevation view of the pipeline padding machine of FIG. 20.
Figure 23:
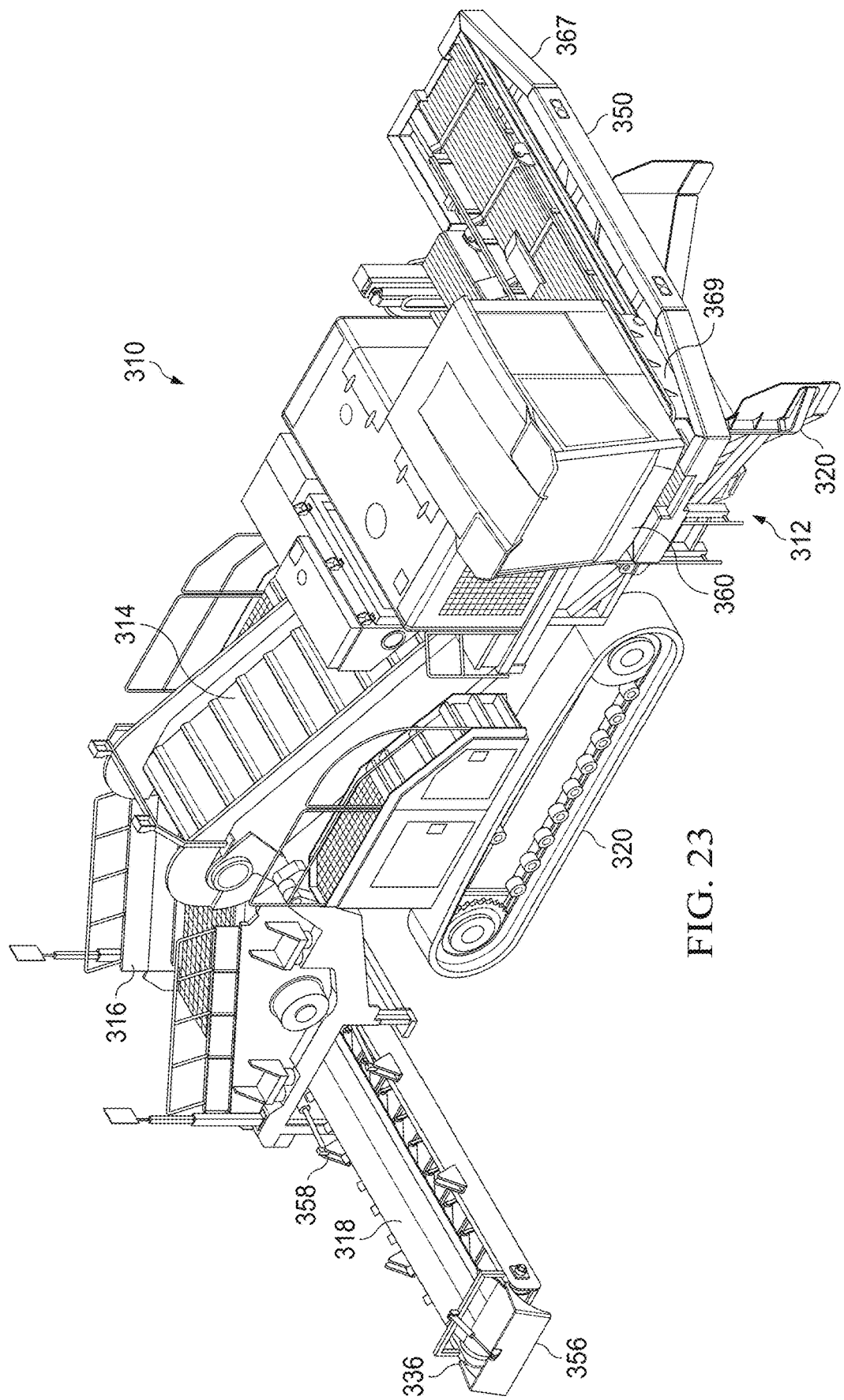
FIG. 23 is a perspective view of the pipeline padding machine of FIG. 20.

FIG. 20 is an elevation view of an embodiment of a pipeline padding machine 310. FIGS. 21-23 are additional views of the pipeline padding machine 310 of FIG. 20. The pipeline padding machine 310 includes features that are similar to the pipeline padding machine 10, the pipeline padding machine 110, and the pipeline padding machine 210. Therefore, unless noted, similar features are identified by similar reference numerals.

With reference to FIGS. 20-23, the pipeline padding machine 310 can utilize the actuators and mechanisms described herein, either alone or in combination to provide a desired range of motion to the cab 360. For example, the cab 360 can be coupled to a rotary pedestal 381. In some embodiments, rotary pedestal 381 can rotate the cab 360 about an axis generally perpendicular to the ground. The rotary pedestal 381 can rotate the cab 360 up to 360 degrees, 300 degrees, 270 degrees, 220 degrees, 180 degrees, 120 degrees, etc. As can be appreciated, the rotary pedestal 381 can be rotated by an electric motor or actuator, a hydraulic actuator, and/or any other suitable actuator.

In some embodiments, a sub-platform 369 can horizontally translate the cab 360 left and/or right relative to the pipeline padding machine 310. Optionally, the sub-platform 369 can translate the rotary pedestal 381 with the cab 360. The sub-platform 369 can be translated along one or more rails 367. In some embodiments, the rails 367 can extend along the width of the pipeline padding machine 310, allowing the sub-platform 369 and therefore the cab 360 to travel the width of the pipeline padding machine 310. Optionally, the rails 367 can extend along a width greater than other portions of the pipeline padding machine 310, allowing the cab 360 to extend past other portions of the pipeline padding machine 310. In some embodiments, the sub-platform 369 can be translated or moved along the rails 367 by an electric motor or actuator, a hydraulic actuator, and/or any other suitable actuator.

In some embodiments, a platform 350 can vertically translate the cab 360 up and down relative to the pipeline padding machine 310 and/or the ground. As illustrated, the platform 350 can extend from the pipeline padding machine 310 and can be coupled to the rails 367, allowing the platform 350 to move the rails 367 when moving the platform 350. As can be appreciated, by moving the rails 367, the sub-platform 369, along with the cab 360 can be vertically translated. Optionally, the platform 350 can include rails, sliders, or another suitable extension mechanism to translate the platform 350. In some embodiments, the platform 350 can be translated or moved vertically by an electric motor or actuator, a hydraulic actuator, and/or any other suitable actuator.

During operation, the platform 350 can lower the cabin 360 to allow for an operator to easily enter or exit the cab 360. In some embodiments, the cab 360 may be lowered any suitable or desired amount to permit access, including but not limited to lowering cab 360 to ground level. During operation, the cab 360 can be elevated to an operating position to allow for greater view for the operation of the machine 310. In some embodiments, the cab 360 can be retracted to a transport position to allow for increased clearance for shipment or transportation.

As can be appreciated, the cab 360 can be moved by one or more of the rotary pedestal 381, the translation of the sub-platform 369, and/or the translation of the platform 350. For example, in some embodiments, a pipeline padding machine may include a rotary pedestal 381 and a platform 350. In some embodiments, a pipeline padding machine may include a sub-platform 369 and a platform 350. In some embodiments, the pipeline padding machine may include a rotary pedestal 381 and a sub-platform 369.

Figure 24:
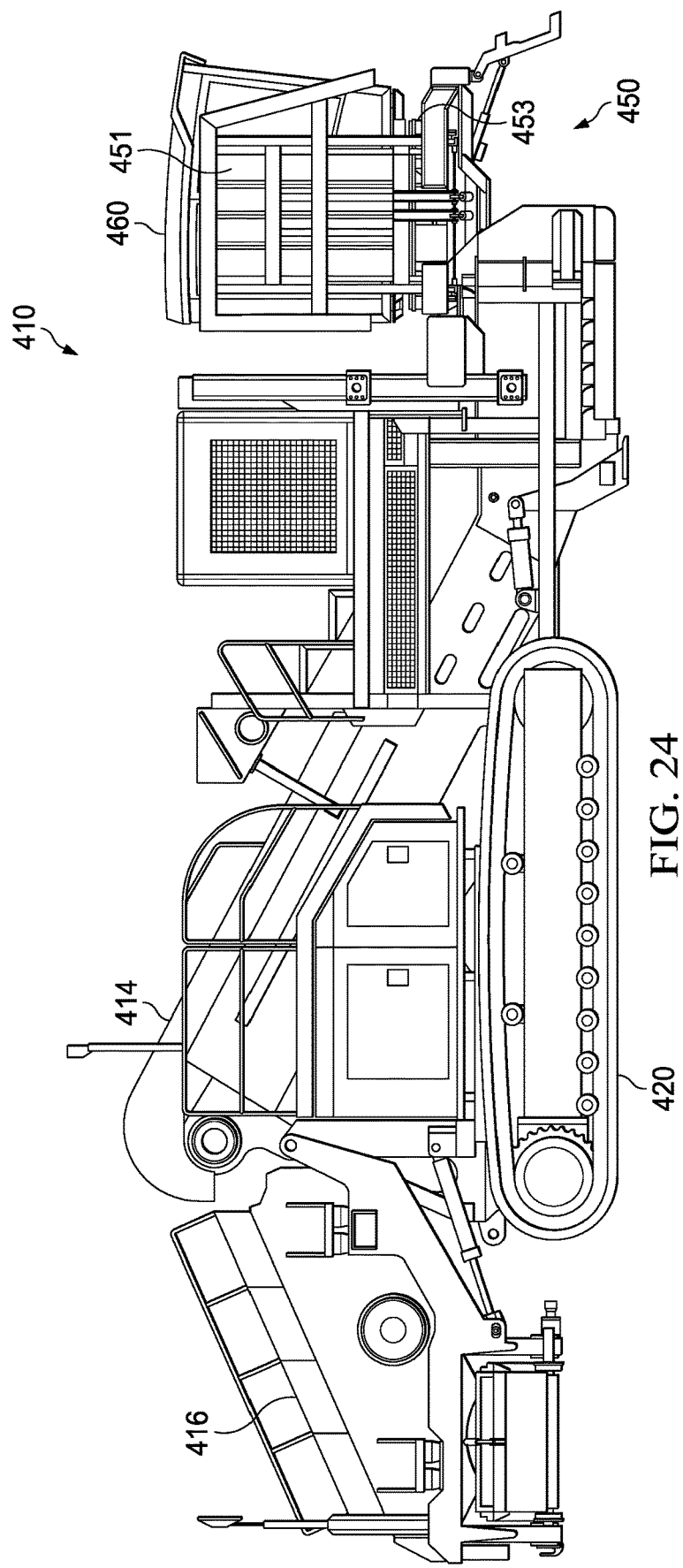
FIG. 24 is a side elevation view of an embodiment of a pipeline padding machine with platform extensions in a folded configuration.
Figure 25:
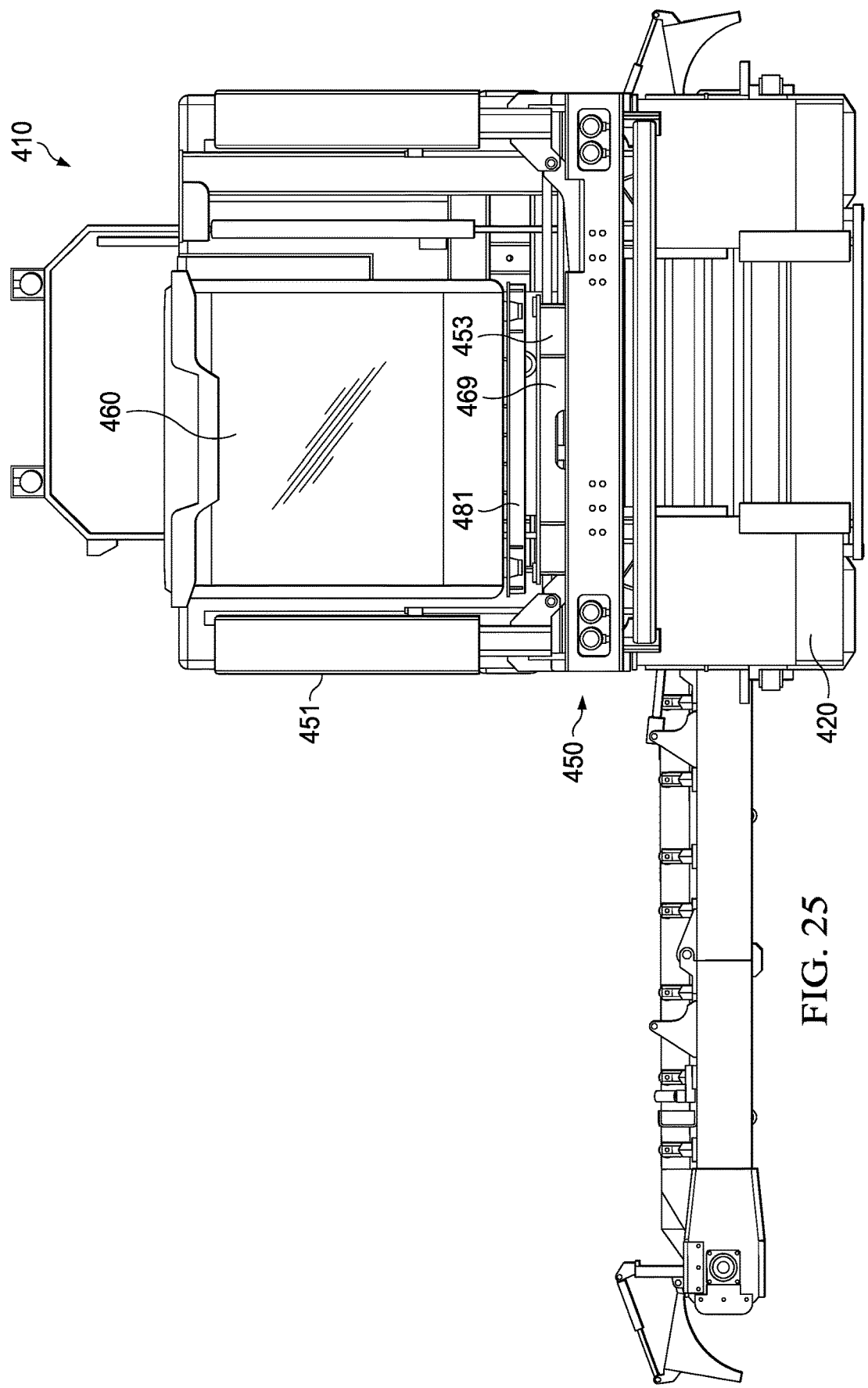
FIG. 25 is a front elevation view of the pipeline padding machine of FIG. 24.
Figure 26:
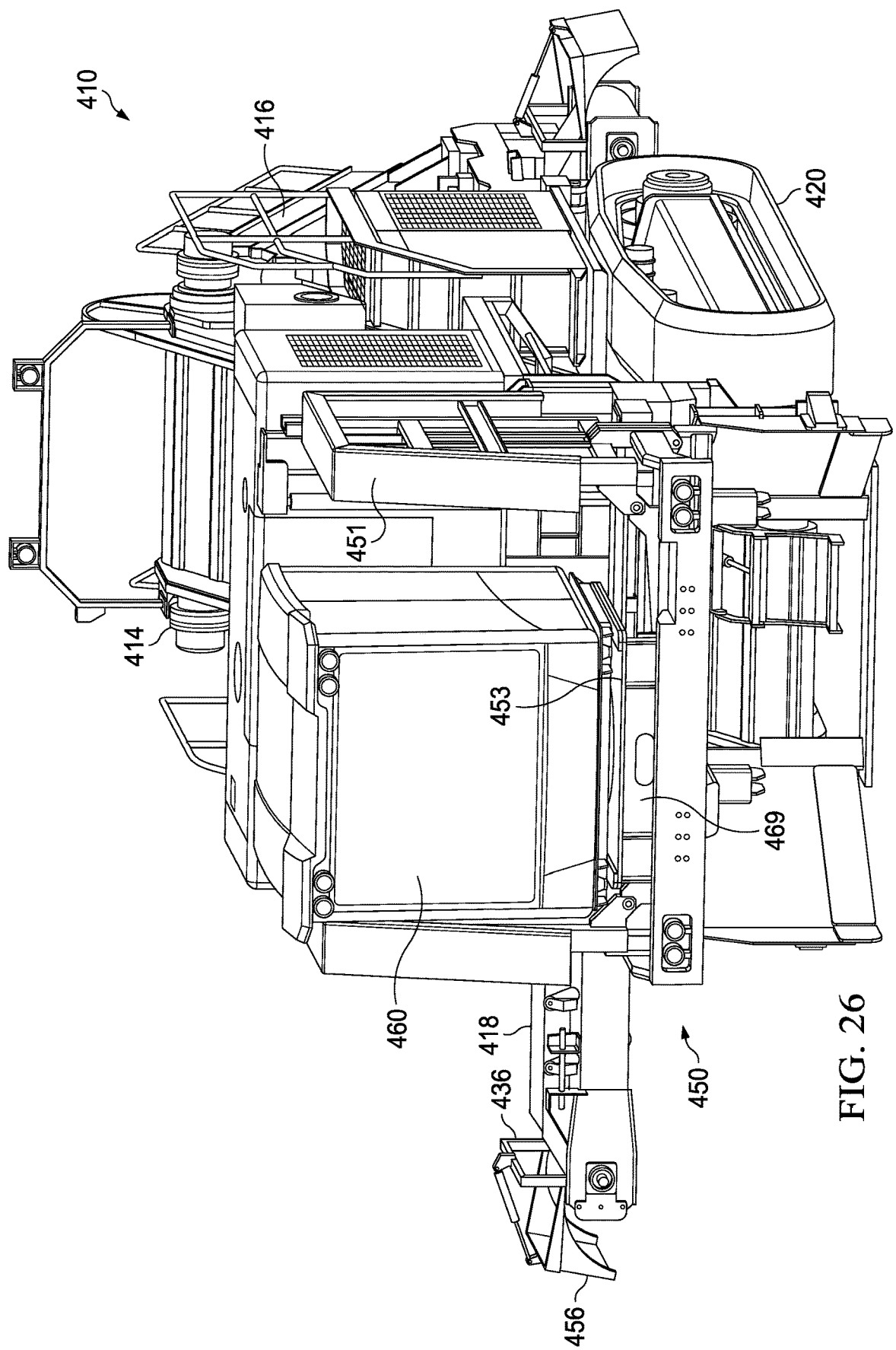
FIG. 26 is a front perspective view of the pipeline padding machine of FIG. 24.
Figure 27:
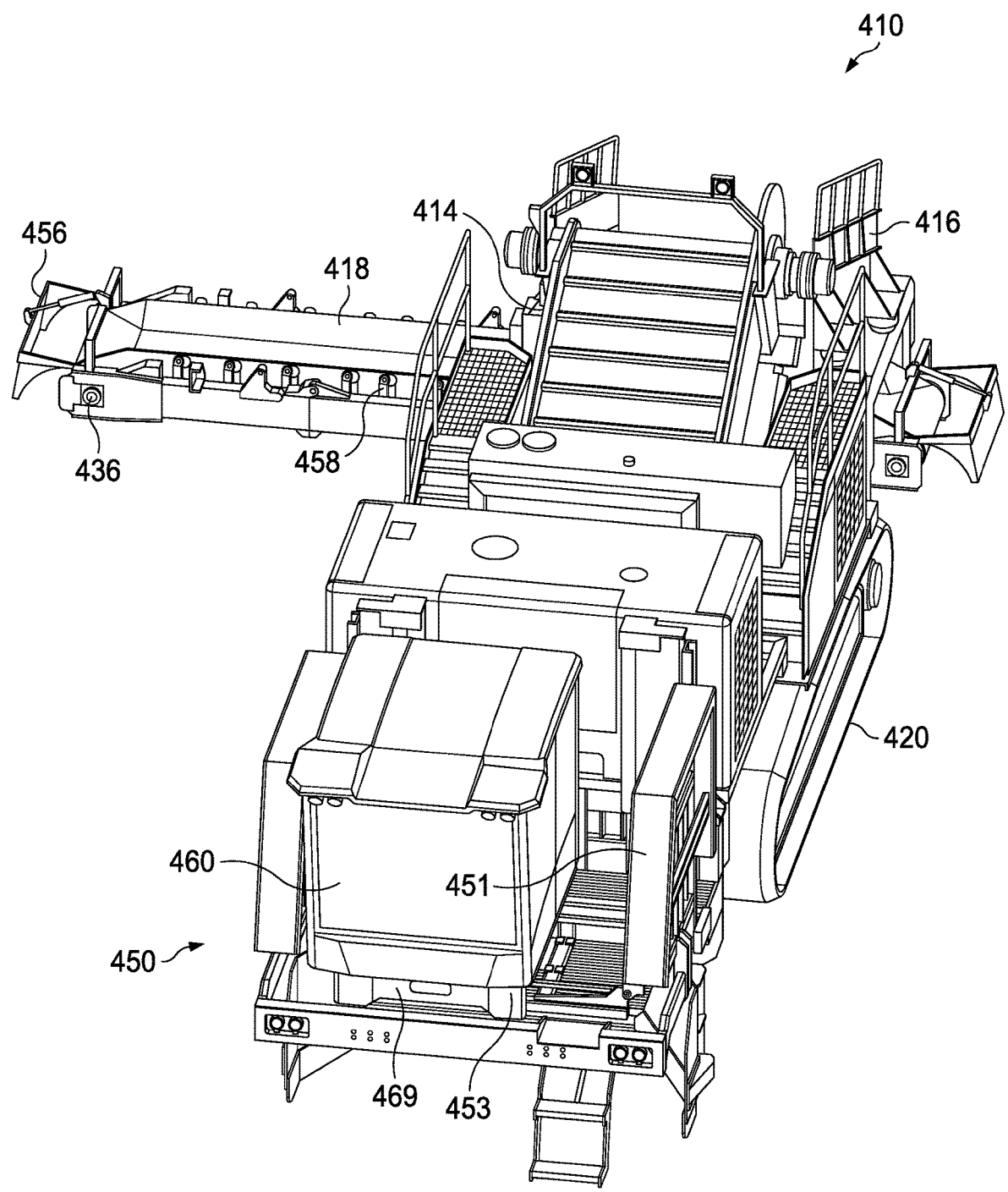
FIG. 27 is a front perspective view of the pipeline padding machine of FIG. 24.
Figure 28:
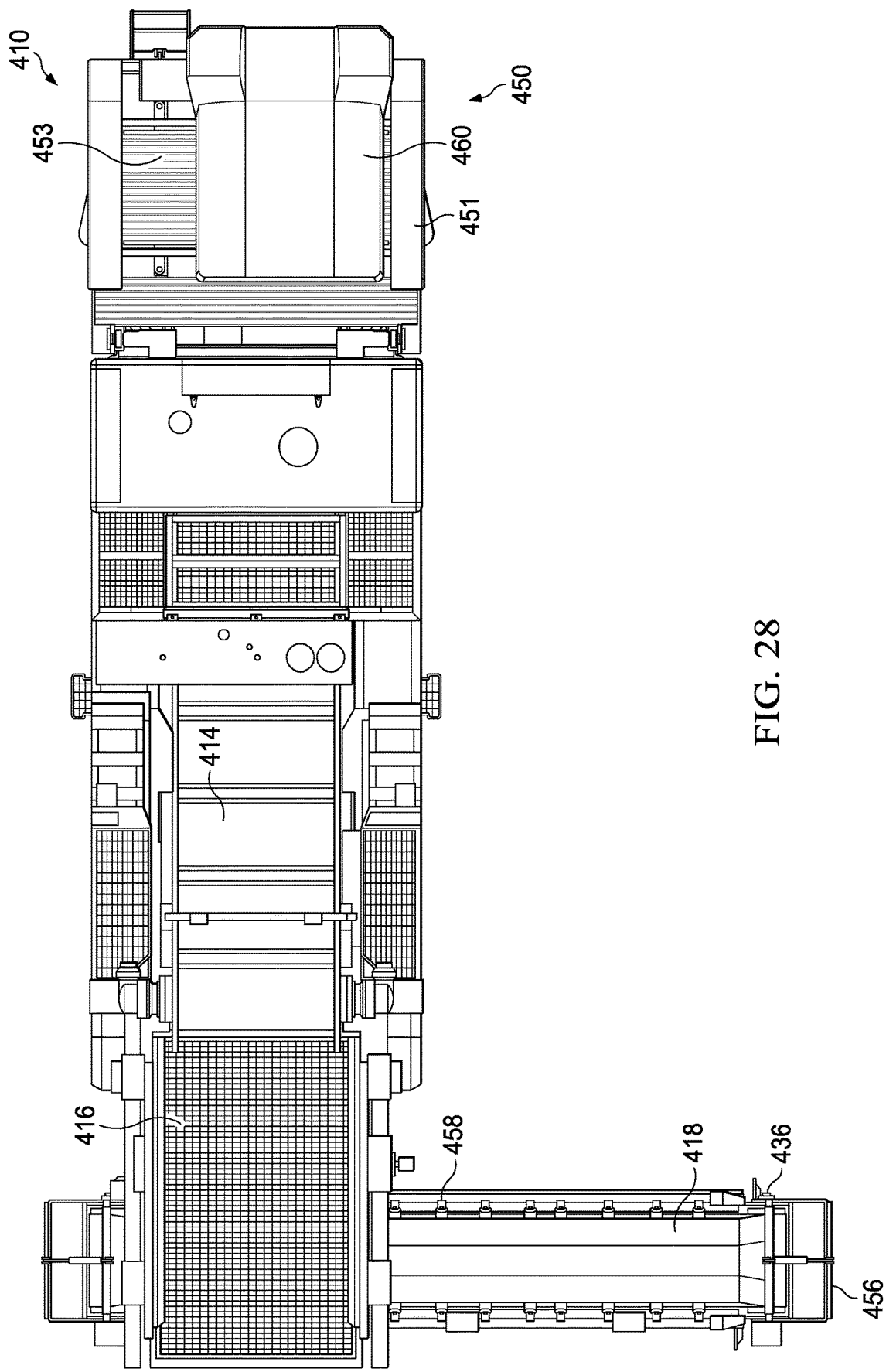
FIG. 28 is a plan view of the pipeline padding machine of FIG. 24
Figure 29:
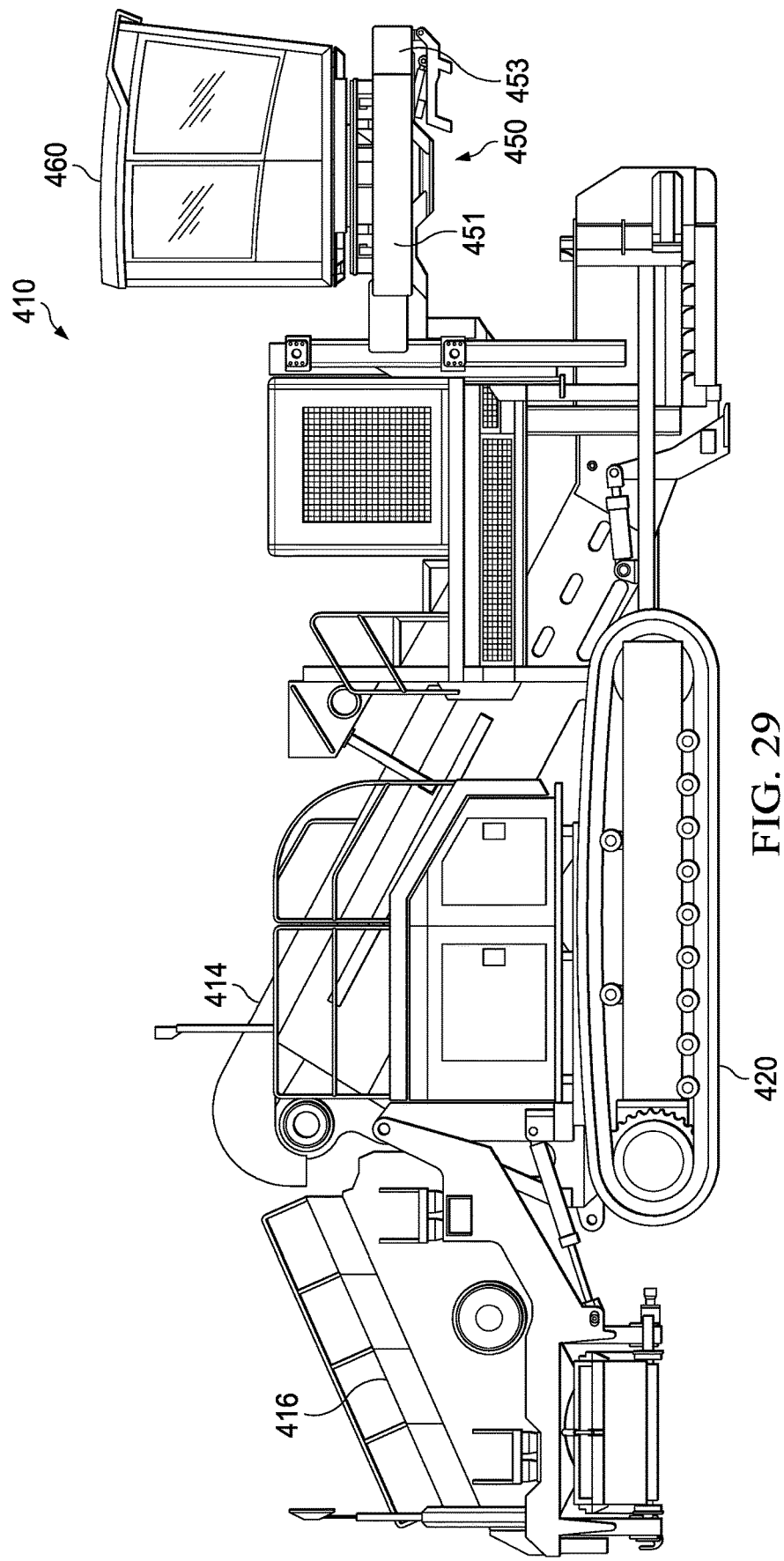
FIG. 29 is a side elevation view of the pipeline padding machine of FIG. 24 with platform extensions in an extended configuration.
Figure 30:
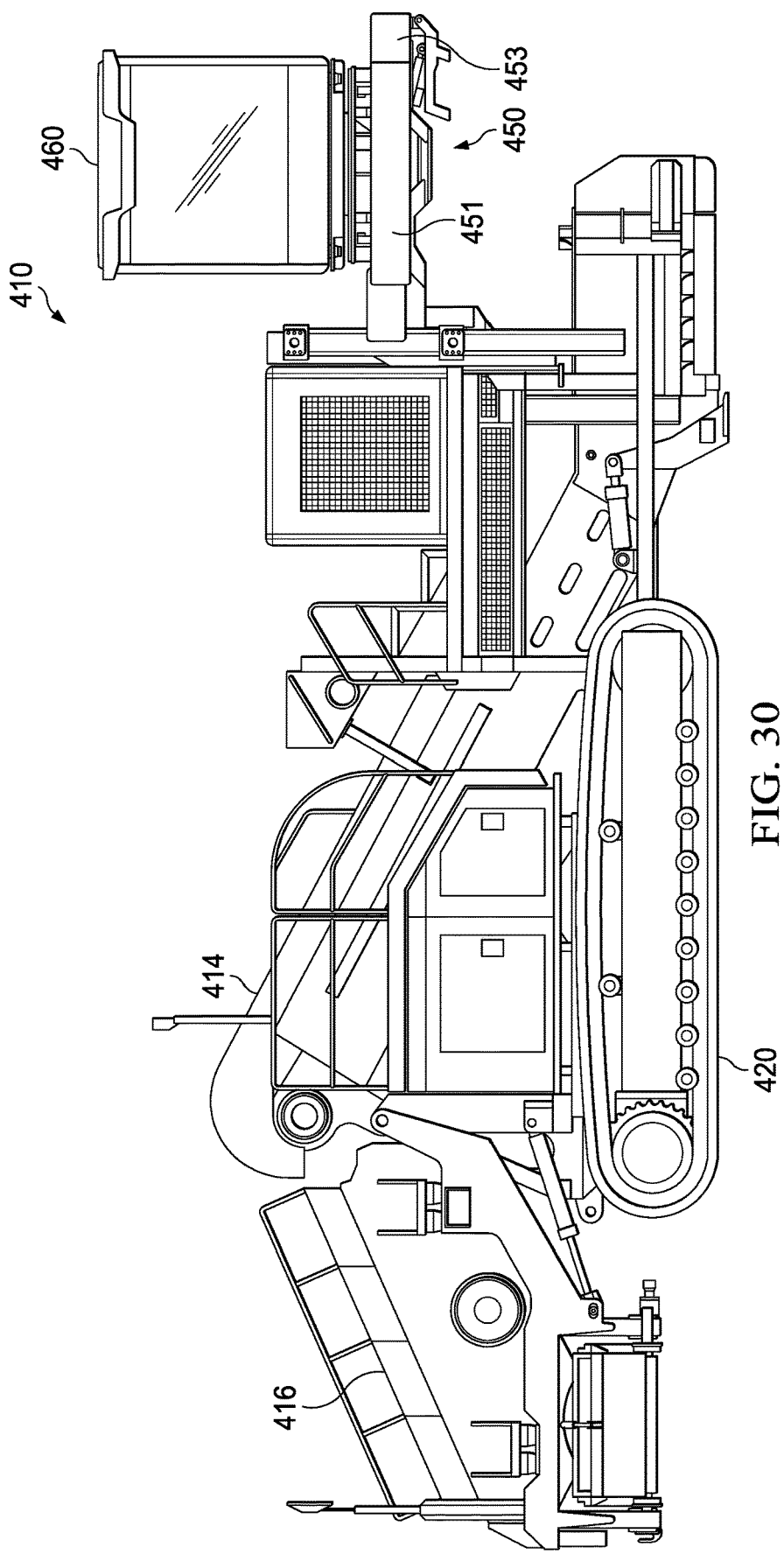
FIG. 30 is a side elevation view of the pipeline padding machine of FIG. 29 with the cab rotated.
Figure 31:
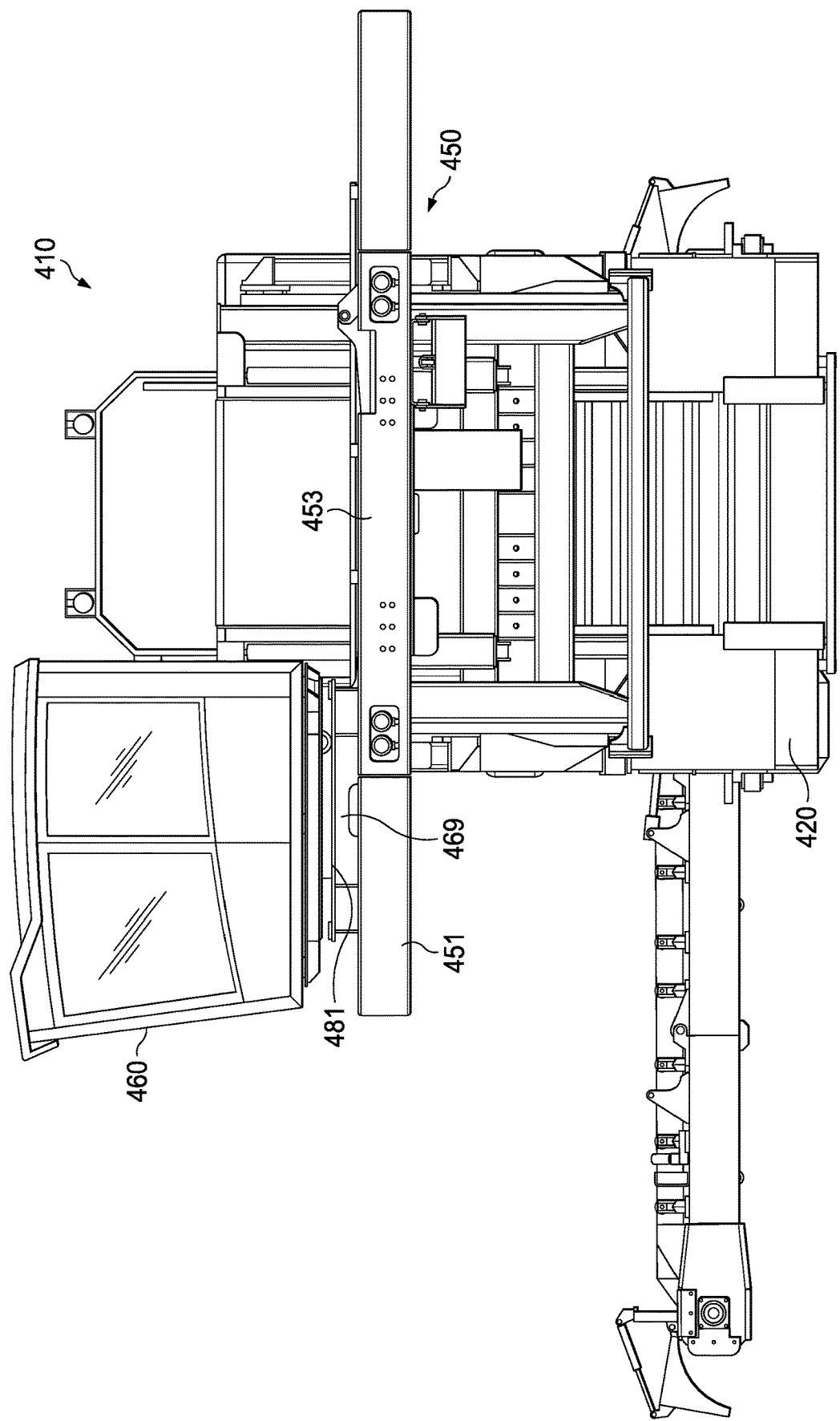
FIG. 31 is a front elevation view of the pipeline padding machine of FIG. 30.
Figure 32:
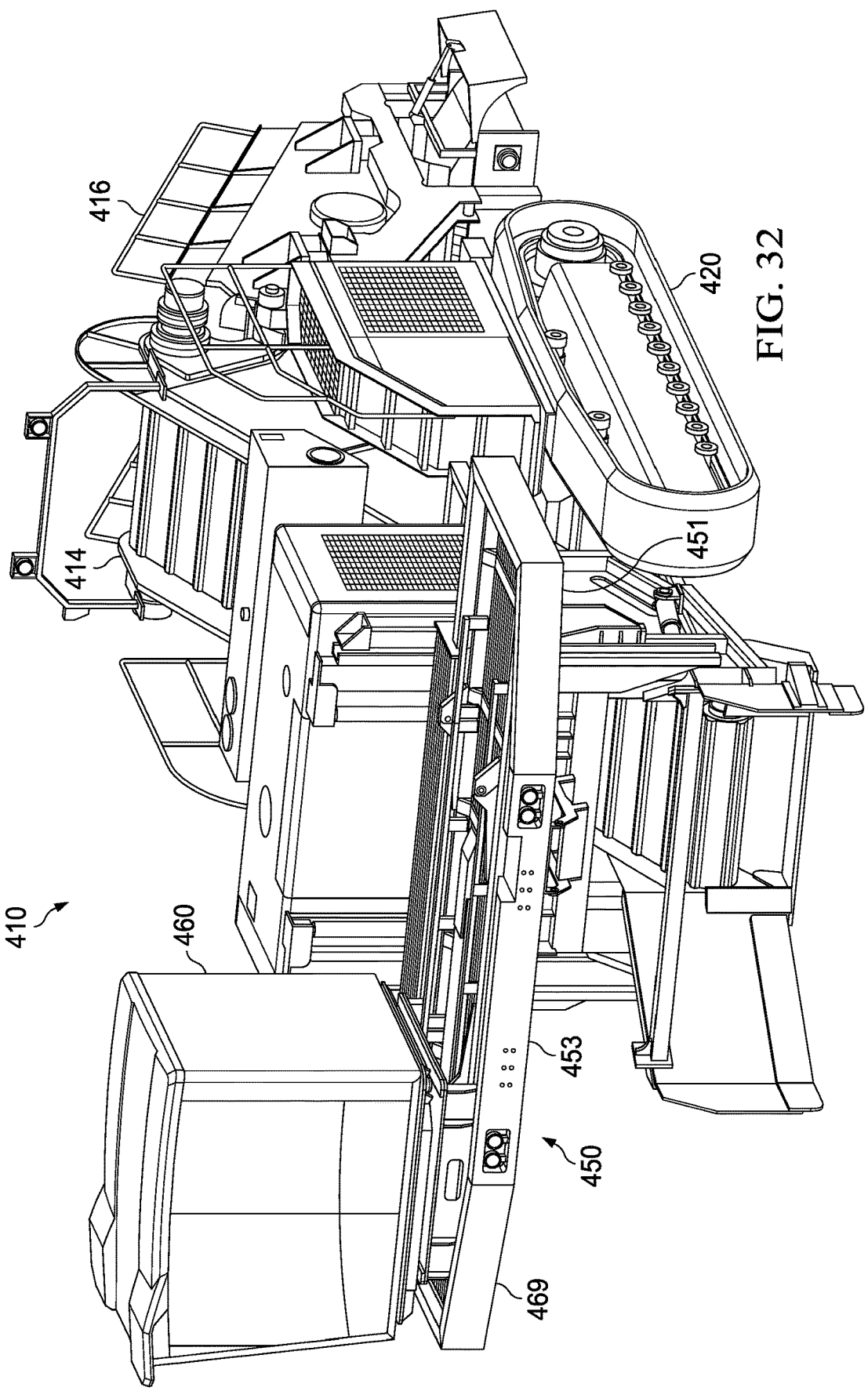
FIG. 32 is a front perspective view of the pipeline padding machine of FIG. 30.
Figure 33:
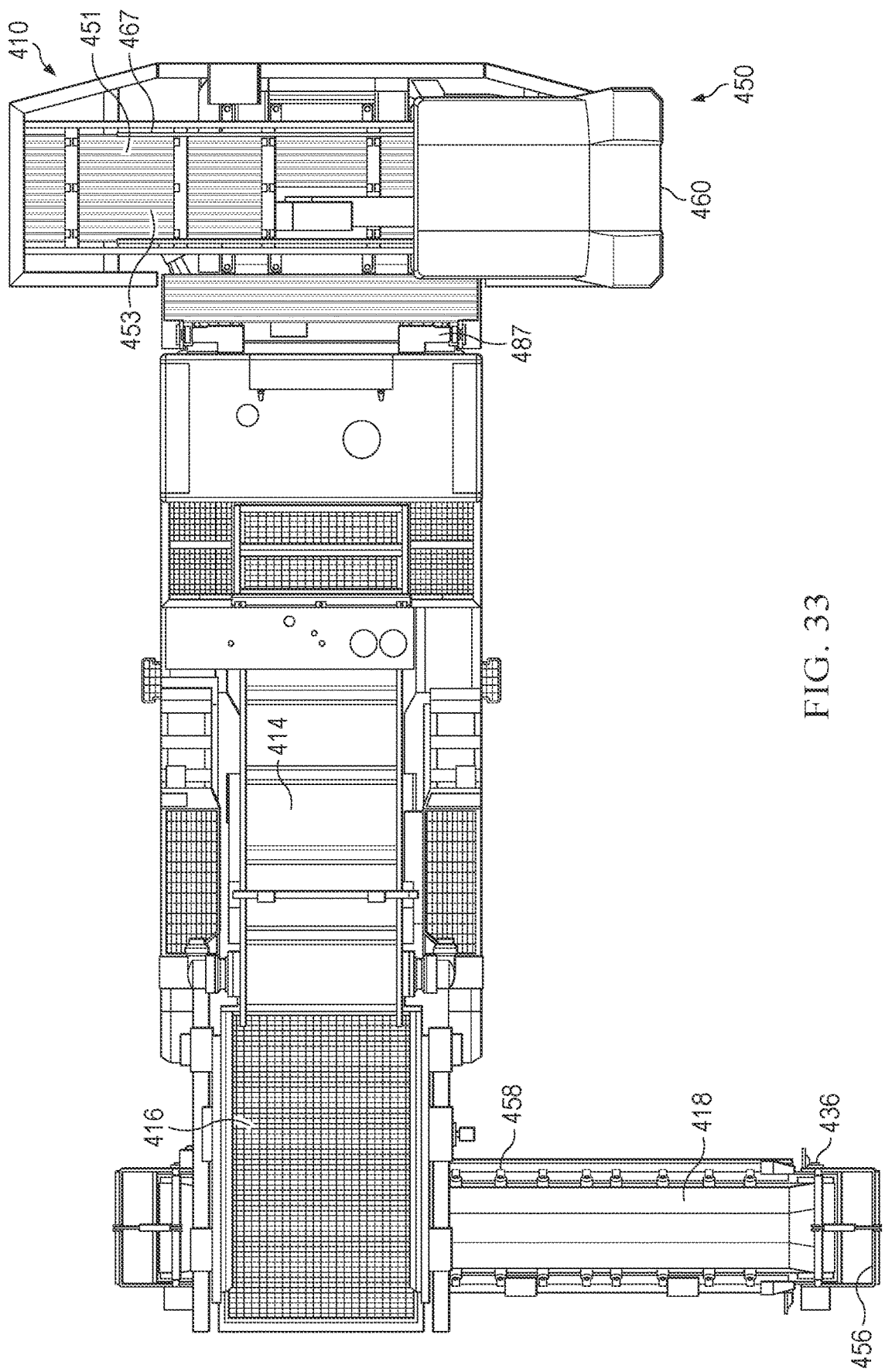
FIG. 33 is a plan view of the pipeline padding machine of FIG. 30.
Figure 34:
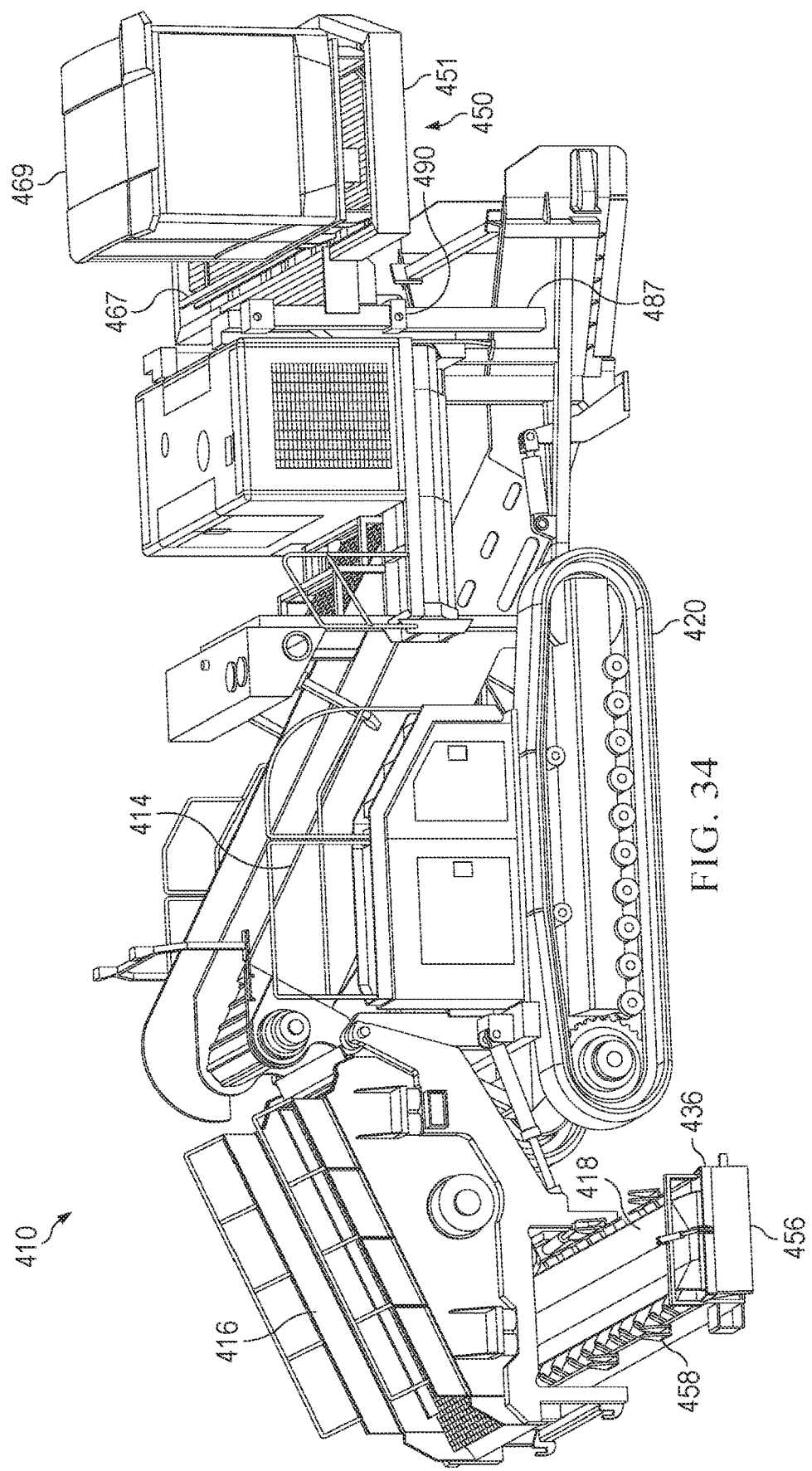
FIG. 34 is a side perspective view of the pipeline padding machine of FIG. 30.

FIG. 24 is a side elevation view of an embodiment of a pipeline padding machine 410 with platform extensions 451 in a folded configuration. FIGS. 25-28 are additional views of the pipeline padding machine 410 of FIG. 24. FIG. 29 is a side elevation view of the pipeline padding machine 410 of FIG. 24 with platform extensions 451 in an extended configuration. FIG. 30 is a side elevation view of the pipeline padding machine 410 of FIG. 29 with the cab 360 rotated. FIGS. 31-34 are additional views of the pipeline padding machine of FIG. 30.

In the depicted example, the pipeline padding machine 410 can retract or fold portions of the platform 450 to allow the pipeline padding machine 410 to be transported with a reduced overall width. As illustrated, the platform 450 can include movable platform extensions 451 pivotally or otherwise movably coupled to a central platform body 453. The movable platform extensions 451 can be folded to be perpendicular, nearly perpendicular, or otherwise non-planar with the central platform body 453.

With reference to FIGS. 29-34, the movable platform extensions 451 can be extended or rotated to an extended position. In the extended position, the movable platform extensions 451 can be generally planar with the central platform body 453, defining an extended platform surface, allowing the cab 460 to laterally translate along the extended length of the platform 450. In some embodiments, the moveable platform extensions 451 can be parallel or nearly parallel with the central platform body 453. The moveable platform extensions 451 can be moved or rotated by one or more actuators.

Similar to pipeline padding machine 310, the pipeline padding machine 410 can utilize the actuators and mechanisms described herein, either alone or in combination to provide a desired range of motion to the cab 460. For example, the cab 460 can be coupled to a rotary pedestal 481. In some embodiments, rotary pedestal 481 can rotate the cab 460 about an axis generally perpendicular to the ground. The rotary pedestal 481 can rotate the cab 460 up to 360 degrees, 300 degrees, 270 degrees, 220 degrees, 180 degrees, 120 degrees, etc. As can be appreciated, the rotary pedestal 481 can be rotated by an electric motor or actuator, a hydraulic actuator, and/or any other suitable actuator.

In some embodiments, a sub-platform 469 can horizontally translate the cab 460 left and/or right relative to the pipeline padding machine 410. Optionally, the sub-platform 469 can translate the rotary pedestal 481 with the cab 460. The sub-platform 469 can be translated along one or more rails 467. In some embodiments, the rails 467 can extend along the width of the pipeline padding machine 410, allowing the sub-platform 469 and therefore the cab 460 to travel the width of the pipeline padding machine 410. Optionally, the rails 467 can extend along a width greater than other portions of the pipeline padding machine 410, allowing the cab 460 to extend past other portions of the pipeline padding machine 410. In some embodiments, the sub-platform 469 can be translated or moved along the rails 467 by an electric motor or actuator, a hydraulic actuator, and/or any other suitable actuator. In some embodiments, the rails 467 can be disposed on, and movable with the platform extensions 451.

In some embodiments, a platform 450, including the platform body 453 and the platform extensions 451 can vertically translate the cab 460 up and down relative to the pipeline padding machine 410 and/or the ground. As illustrated, the platform 450 can extend from the pipeline padding machine 410 and can be coupled to the rails 487, allowing the platform 450 to move along the rails 487 when moving the platform 450. As can be appreciated, by moving along the rails 487, the sub-platform 469, along with the cab 460 can be vertically translated. Optionally, the platform 450 can include rails, sliders 490, or another suitable extension mechanism to translate the platform 450. In some embodiments, the platform 450 can be translated or moved vertically by an electric motor or actuator, a hydraulic actuator, and/or any other suitable actuator.

During operation, the platform 450 can lower the cabin 460 to allow for an operator to easily enter or exit the cab 460. In some embodiments, the cab 460 may be lowered any suitable or desired amount to permit access, including but not limited to lowering cab 460 to ground level. During operation, the cab 460 can be elevated to an operating position to allow for greater view for the operation of the machine 410. In some embodiments, the cab 460 can be retracted to a transport position to allow for increased clearance for shipment or transportation.

As can be appreciated, the cab 460 can be moved by one or more of the rotary pedestal 481, the translation of the sub-platform 469, and/or the translation of the platform 450. For example, in some embodiments, a pipeline padding machine may include a rotary pedestal 481 and a platform 450. In some embodiments, a pipeline padding machine may include a sub-platform 469 and a platform 450. In some embodiments, the pipeline padding machine may include a rotary pedestal 481 and a sub-platform 469.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A pipeline padding machine, comprising:
a machine main frame;
a material collection assembly comprising a cutting edge and side walls;
a material escalator assembly configured to receive material from the material collection assembly;
a separator assembly configured to receive material from the material escalator assembly and separate the material into a first portion of relatively smaller particles and a second portion of relatively larger particles;
a conveyor assembly configured to receive and transport the first portion of relatively smaller particles;
a cabin coupled to the machine main frame; and
an extension mechanism coupling the cabin to the machine main frame, wherein the extension mechanism is configured to translate the cabin vertically relative to the machine main frame.

2. The pipeline padding machine of claim 1, wherein the extension mechanism comprises a plurality of members and the plurality of members are configured to translate the cabin vertically relative to the machine main frame.

3. The pipeline padding machine of claim 1, wherein the extension mechanism comprises a platform coupling the cabin to the machine main frame, wherein the platform is configured to translate the cabin vertically relative to the machine main frame.

4. The pipeline padding machine of claim 3, wherein the platform comprises one or more platform extensions movably coupled to a platform body, the one or more platform extensions movable from a folded position relative to the platform body to an extended position relative to the platform body defining an extended platform surface to permit lateral movement of the cabin.

5. The pipeline padding machine of claim 1, wherein the extension mechanism is configured to lower the cabin to a ground position.

6. The pipeline padding machine of claim 1, wherein the extension mechanism is configured to lower the cabin to a near ground position.

7. The pipeline padding machine of claim 1, wherein the extension mechanism is configured to extend the cabin to an operating position.

8. The pipeline padding machine of claim 1, wherein the extension mechanism is configured to move the cabin to a transport position.

9. The pipeline padding machine of claim 1, further comprising:
a slider mechanism coupling the cabin to the frame, the slider mechanism comprising:
a rail extending laterally and configured to receive the cabin; and
an actuator configured to laterally move the cabin along the rail.

10. The pipeline padding machine of claim 9, wherein the slider mechanism comprises a sub-platform coupling the cabin to the frame, wherein the sub-platform is coupled to the rail.

11. The pipeline padding machine of claim 9, wherein the cabin is configured to be vertically translated and laterally moved simultaneously.

12. The pipeline padding machine of claim 1, further comprising:
a pivot coupling the cabin to the frame, wherein the pivot is configured to permit the cabin to rotate relative to the frame.

13. The pipeline padding machine of claim 12, wherein the pivot comprises a rotary pedestal.

14. The pipeline padding machine of claim 12, wherein the cabin is configured to rotate up to 180 degrees from an original position.

15. The pipeline padding machine of claim 1, further comprising:
an operator's chair disposed within the cabin, wherein the operator's chair is independently rotatable relative to the cabin.

16. The pipeline padding machine of claim 1, further comprising an extension pivot rotatably coupling the extension mechanism to the machine main frame.

17. The pipeline padding machine of claim 1, further comprising a telescopic arm configured to move the cabin toward and away from the frame.

18. A pipeline padding machine, comprising:
a machine main frame;
a material collection assembly comprising a cutting edge and side walls;
a material escalator assembly configured to receive material from the material collection assembly;
a separator assembly configured to receive material from the material escalator assembly and separate the material into a first portion of relatively smaller particles and a second portion of relatively larger particles;
a conveyor assembly configured to receive and transport the first portion of relatively smaller particles;
a cabin coupled to the machine main frame; and
a slider mechanism coupling the cabin to the frame, the slider mechanism comprising:
a rail extending vertically and configured to receive the cabin; and
an actuator configured to vertically move the cabin along the rail.

19. The pipeline padding machine of claim 18 wherein the slider mechanism comprises a sub-platform coupling the cabin to the frame, wherein the sub-platform is coupled to the rail.

20. The pipeline padding machine of claim 18, further comprising:
a pivot coupling the cabin to the frame, wherein the pivot is configured to permit the cabin to rotate relative to the frame.

21. The pipeline padding machine of claim 20, wherein the pivot comprises a rotary pedestal.

22. The pipeline padding machine of claim 18, wherein the cabin is configured to rotate up to 180 degrees from an original position.

23. The pipeline padding machine of claim 18, further comprising:
an operator's chair disposed within the cabin, wherein the operator's chair is coupled to the cabin.

24. The pipeline padding machine of claim 23, wherein the operator's chair is independently rotatable relative to the cabin.

25. A pipeline padding machine, comprising:
a machine main frame;
a material collection assembly comprising a cutting edge and side walls;
a material escalator assembly configured to receive material from the material collection assembly;
a separator assembly configured to receive material from the material escalator assembly and separate the material into a first portion of relatively smaller particles and a second portion of relatively larger particles;
a conveyor assembly configured to receive and transport the first portion of relatively smaller particles;
a cabin coupled to the machine main frame; and
a pivot coupling the cabin to the frame, wherein the pivot is configured to permit the cabin to rotate relative to the frame.

26. The pipeline padding machine of claim 25, wherein the pivot comprises a rotary pedestal.

27. The pipeline padding machine of claim 25, wherein the cabin is configured to rotate up to 180 degrees from an original position.

28. The pipeline padding machine of claim 25, further comprising:
an operator's chair disposed within the cabin, wherein the operator's chair is coupled to the cabin.

29. The pipeline padding machine of claim 28, wherein the operator's chair is rotatable relative to the cabin.

30. A method to operate a pipeline padding machine, the method comprising:
collecting material with a material collection assembly comprising a cutting edge and side walls;
transporting the collected material with a material escalator assembly;
separating the material into a first portion of relatively smaller particles and a second portion of relatively larger particles;
receiving and transporting the first portion of relatively smaller particles with a conveyor assembly;

lowering a cabin of the pipeline padding machine relative to the pipeline padding machine to an access position; and raising the cabin of the pipeline padding machine to an operation position.

31. The method of claim 30, further comprising:

laterally moving the cabin of the pipeline padding machine while lowering the cabin.

32. The method of claim 30, further comprising:

rotating the cabin of the pipeline padding machine.

33. The method of claim 30, further comprising:

rotating an operator's chair within the cabin.

34. The method of claim 30, further comprising:

moving one or more platform extensions from a folded position to an extended position to define an extended platform surface; and permitting lateral movement of the cabin on the extended platform surface.

\* \* \* \* \*